US012677304B2

(12) United States Patent　　(10) Patent No.:　US 12,677,304 B2

Fehrenbach et al.　　(45) Date of Patent:　Jul. 7, 2026

(54) TRANSCEIVER FOR CONDITIONALLY PARTICIPATING IN AT LEAST ONE COMMUNICATION SERVICE

(71) Applicant: Fraunhofer-Gesellschaft zur Foerderung der angewandten Forschung e.V., Munich (DE)

(72) Inventors: Thomas Fehrenbach, Berlin (DE); Cornelius Hellge, Berlin (DE); Thomas Wirth, Berlin (DE); Thomas Schierl, Berlin (DE); Sarun Selvanesan, Berlin (DE); Baris Goektepe, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 502 days.

(21) Appl. No.: 17/671,358

(22) Filed: Feb. 14, 2022

(65) Prior Publication Data

US 2022/0167347 A1　　May 26, 2022

Related U.S. Application Data

(63) Continuation of application No. PCT/EP2020/072638, filed on Aug. 12, 2020.

(30) Foreign Application Priority Data

Aug. 14, 2019　(EP) ..................................... 19191860

(51) Int. Cl.
H04W 72/51　　(2023.01)

(52) U.S. Cl.
CPC .................................. H04W 72/51 (2023.01)

(58) Field of Classification Search
CPC ......... H04W 4/021; H04W 4/44; H04W 4/46; H04W 4/50; H04W 24/04; H04W 48/10;
(Continued)

(56) References Cited

U.S. PATENT DOCUMENTS 8,792,900 B2 *　7/2014　Chen ..................... H04W 28/26
　　　　　　　　　　　　　　　455/452.1
9,596,689 B2 *　3/2017　Cai ........................ H04W 72/51
(Continued)

FOREIGN PATENT DOCUMENTS

CA　　　　3073572 A1　　5/2019
CN　　105144801 A　　12/2015
(Continued)

OTHER PUBLICATIONS

"Leftover Issues for Sidelink Configured Grant", CATT, 3GPP TSG RAN WG2 #106 R2-1905795, Internet, May 2019, 7 pp.
(Continued)

*Primary Examiner* — Eric Nowlin

(74) *Attorney, Agent, or Firm* — Perkins Cole LLP; Michael A. Glenn

(57) ABSTRACT

The present invention concerns a transceiver being configured to participate in at least one communication service provided by a wireless communication network, the transceiver having a communication interface for receiving and/or transmitting communication data pertaining to the at least one communication service. The transceiver is configured to transmit and/or receive the communication data pertaining to the at least one communication service only if at least one of the following predetermined criteria is met: a) the current location of the transceiver is determined to be inside a designated geographical area being related to the at least one communication service, b) the transceiver receives an intimation signal from a second being different to the at least (Continued)

one communication service, c) the transceiver received communication data pertaining to the at least one communication.

18 Claims, 7 Drawing Sheets

(58) Field of Classification Search
CPC ..... H04W 72/20; H04W 72/51; H04W 88/04; H04W 92/18
See application file for complete search history.

(56) References Cited

U.S. PATENT DOCUMENTS

| | | | | |
|---|---|---|---|---|
| 9,992,781 | B2 * | 6/2018 | Chatterjee | H04W 72/51 |
| 10,128,936 | B2 * | 11/2018 | Kim | H04W 76/14 |
| 10,136,447 | B2 * | 11/2018 | Chatterjee | H04W 56/002 |
| 10,200,910 | B1 * | 2/2019 | Marupaduga | H04W 28/0278 |
| 10,225,872 | B2 * | 3/2019 | Wu | H04W 76/14 |
| 10,278,207 | B2 * | 4/2019 | Lee | H04L 1/0025 |
| 10,368,381 | B2 * | 7/2019 | Hahn | H04W 76/14 |
| 10,383,097 | B2 * | 8/2019 | Wang | H04W 72/20 |
| 10,531,435 | B2 * | 1/2020 | Luo | H04W 88/04 |
| 10,805,891 | B2 * | 10/2020 | Park | H04W 56/001 |
| 10,873,843 | B2 * | 12/2020 | Lee | H04W 72/23 |
| 11,184,834 | B2 * | 11/2021 | Chun | H04W 48/08 |
| 11,582,718 | B2 * | 2/2023 | Yu | H04W 80/08 |
| 11,616,630 | B2 * | 3/2023 | Ji | H04L 5/0044 |
| | | | | 370/329 |
| 12,177,925 | B2 * | 12/2024 | Wu | H04W 48/12 |
| 2009/0154379 | A1 * | 6/2009 | Hayashi | H04W 72/04 |
| | | | | 370/280 |
| 2012/0077510 | A1 * | 3/2012 | Chen | H04W 28/26 |
| | | | | 455/452.1 |
| 2014/0171062 | A1 * | 6/2014 | Fallgren | H04W 40/22 |
| | | | | 455/422.1 |
| 2015/0264588 | A1 * | 9/2015 | Li | H04W 56/002 |
| | | | | 370/350 |
| 2015/0365991 | A1 * | 12/2015 | Wu | H04W 76/14 |
| | | | | 370/329 |
| 2016/0057702 | A1 | 2/2016 | Morioka | |
| 2016/0075332 | A1 * | 3/2016 | Edo-Ros | B60W 30/0956 |
| | | | | 701/70 |
| 2016/0095074 | A1 * | 3/2016 | Park | H04W 56/001 |
| | | | | 370/350 |
| 2016/0183237 | A1 * | 6/2016 | Cai | H04W 72/51 |
| | | | | 370/329 |
| 2016/0219541 | A1 * | 7/2016 | Chatterjee | H04W 76/15 |
| 2017/0126306 | A1 * | 5/2017 | Kim | H04W 72/044 |
| 2017/0127405 | A1 * | 5/2017 | Agiwal | H04W 76/14 |
| 2017/0311344 | A1 * | 10/2017 | Lee | H04W 74/0833 |
| 2017/0339511 | A1 * | 11/2017 | Lee | H04W 72/0446 |
| 2018/0020459 | A1 * | 1/2018 | Chatterjee | H04W 4/50 |
| 2018/0139741 | A1 * | 5/2018 | Wang | H04L 45/74 |
| 2018/0184270 | A1 * | 6/2018 | Chun | H04W 8/22 |
| 2018/0213379 | A1 * | 7/2018 | Xiong | H04W 4/70 |
| 2019/0028862 | A1 * | 1/2019 | Futaki | H04W 4/44 |
| 2019/0037435 | A1 * | 1/2019 | Li | H04W 72/21 |
| 2019/0116462 | A1 * | 4/2019 | Sagesaka | H04W 4/44 |
| 2019/0182747 | A1 * | 6/2019 | Chun | H04W 48/08 |
| 2019/0261226 | A1 * | 8/2019 | Ayaz | H04W 4/02 |
| 2019/0327012 | A1 * | 10/2019 | Park | H04W 4/06 |
| 2020/0037132 | A1 * | 1/2020 | Wu | H04W 76/14 |
| 2020/0252909 | A1 * | 8/2020 | Yu | H04W 80/08 |
| 2020/0389900 | A1 * | 12/2020 | Lee | H04W 72/53 |
| 2022/0295330 | A1 * | 9/2022 | Ji | H04W 28/0205 |
| 2022/0312535 | A1 * | 9/2022 | Wu | H04L 65/1016 |
| 2024/0244509 | A1 * | 7/2024 | Wu | H04B 7/15528 |
| 2025/0081147 | A1 * | 3/2025 | Vassilovski | H04W 52/322 |
| 2025/0119976 | A1 * | 4/2025 | Wu | H04W 48/12 |

FOREIGN PATENT DOCUMENTS

| | | | | | |
|---|---|---|---|---|---|
| CN | 109644388 | A | * | 4/2019 | H04W 48/02 |
| CN | 109906621 | A | | 6/2019 | |
| CN | 109644388 | B | * | 6/2021 | H04W 88/04 |
| CN | 113676845 | A | * | 11/2021 | H04W 4/06 |
| CN | 113676845 | B | * | 4/2023 | H04W 4/06 |
| CN | 116261915 | A | * | 6/2023 | H04W 48/12 |
| CN | 117296445 | A | * | 12/2023 | H04W 48/14 |
| EP | 3267748 | A1 | * | 1/2018 | H04W 4/023 |
| EP | 3352484 | | | 7/2018 | |
| EP | 3416436 | | | 12/2018 | |
| EP | 3490300 | A1 | * | 5/2019 | H04W 48/02 |
| EP | 3490300 | B1 | * | 6/2022 | H04W 40/22 |
| EP | 3267748 | B1 | * | 8/2023 | H04W 4/023 |
| JP | 2009152670 | A | | 7/2009 | |
| JP | 2018050101 | A | | 3/2018 | |
| JP | 2019074853 | A | | 5/2019 | |
| JP | 7120716 | B2 | * | 8/2022 | H04L 5/003 |
| WO | 2015019465 | A1 | | 2/2015 | |
| WO | 2015045860 | A1 | | 4/2015 | |
| WO | WO-2016138822 | A1 | * | 9/2016 | H04W 4/023 |
| WO | 2017136627 | | | 8/2017 | |
| WO | 2018061759 | A1 | | 4/2018 | |
| WO | 2019138973 | A1 | | 7/2019 | |
| WO | WO-2021028616 | A1 | * | 2/2021 | H04L 67/322 |
| WO | WO-2025050376 | A1 | * | 3/2025 | H04L 1/1825 |

OTHER PUBLICATIONS

"NR sidelink more-1 resource allocation", MediaTek Inc., 3GPP TSG RAN WG1 #97 R1-1906554, May 2019, 9 pp.

LG Electronics , "Discussion on physical layer structure for NR V2X", R1-1901930, Discussion on physical layer structure for NR V2X, 3GPP TSG RAN WG1 #96, 3GPP (Feb. 16, 2019), Feb. 16, 2019.

Vivo , "Support of NR Uu controlling LTE sidelink", R1-1906144, Support of NR Uu controlling LTE sidelink, 3GPP TSG RAN WG1 #97, 3GPP, (May 1, 2019), May 1, 2019.

* cited by examiner

100

102 core network external networks

RAN₁

. . . backhaul 114

RAN₂    RANₙ

108₁    108₂

UE₁    gNBs ←→ core    UE₂

116₂    gNB₂    114₂

106₂

ANT gNBs ←→

116₁    gNB₁    114₁

106₁

112₂    108₃    112₁

110₁

IoT    UE₃    gNBs ←→ core    IoT

116₄    gNB₄    114₄

110₂    106₄ gNBs ←→

116₅    gNB₅    114₅

106₅    RANn gNBs ←→

116₃    gNB₃    114₃

106₃

TRANSCEIVER FOR CONDITIONALLY PARTICIPATING IN AT LEAST ONE COMMUNICATION SERVICE

CROSS-REFERENCE TO RELATED APPLICATIONS

This application is a continuation of copending International Application No. PCT/EP2020/072638, filed Aug. 12, 2020, which is incorporated herein by reference in its entirety, and additionally claims priority from European Application No. 19191860.6, filed Aug. 14, 2019, which is also incorporated herein by reference in its entirety.

BACKGROUND OF THE INVENTION

The present application relates to the field of wireless communication systems or networks, more specifically to approaches for a wireless communication among user devices of a wireless communication system using dedicated communication resources for a communication being related to at least one communication service provided by a base station and/or by the network. The at least one communication service may be permanently or conditionally available, i.e. it may be available only if at least one predetermined condition is fulfilled. Embodiments and some non-limiting examples may concern improvements and enhancements for Pedestrian UEs inside a communication environment being related to Vehicle-to-Everything (V2X) services.

FIGS. 1a and 1b are schematic representations of an example of a terrestrial wireless network 100 including, as is shown in FIG. 1a, a core network 102 and one or more radio access networks $RAN_1$, $RAN_2$, ... $RAN_N$. FIG. 1b is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT (Internet of Things) devices which connect to a base station or to a user. The mobile devices or the IoT devices may include physical devices, ground based vehicles, such as robots or cars, aerial vehicles, mobile machines, smart devices like smart watches, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure.

Note, the example is not limited to terrestrial wireless networks, but network entities can involve non-terrestrial networks (NTN), where parts of a BS, and/or BS and/or core network can be payload of a satellite (LEO, GEO, MEO) or high altitude platform (HAPs), e.g. balloon or special airplane.

FIG. 1b shows an exemplary view of five cells, however, the $RAN_D$ may include more or less such cells, and $RAN_n$ may also include only one base station. FIG. 1b shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1b shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNIB_1$ to $gNB_5$ may be connected to the core network 102, e.g. via the S1 interface, via respective backhaul links $114_1$ to $114_5$, which are schematically represented in FIG. 1b by the arrows pointing to "core". The core network 102 may be connected to one or more external networks as well as the Internet. Further, some or all of the respective base station $gNIB_1$ to $gNB_5$ may connected, e.g. via the S1 or X2 interface or the XN interface in NR, with each other via respective backhaul links $116_1$ to $116_5$, which are schematically represented in FIG. 1b by the arrows pointing to "gNBs". The network can also contain UEs communicating in direct mode, also referred to as device-to-device (D2D) communication. This interface is often referred to as PC5 interface.

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The sidelink can also comprise the physical sidelink feedback channel (PSFCH). The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a pre-defined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard or the NR-U, New Radio Unlicensed, standard, or the NR-NTN, Non-terrestrial Networks, standard, or the 3GPP UAV, Unlicensed Aerial Vehicles, standard, or the IoT, Internet of Things, standard or the 802.11ax, or the 802.11be specification.

The wireless network or communication system as depicted in FIGS. 1a and 1b may be a heterogeneous network having distinct overlaid networks, e.g., a network of macro cells with each macro cell including a macro base station, like base station gNIB$_1$ to gNB$_5$, and a network of small cell base stations (not shown in FIGS. 1a and 1b), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIGS. 1a and 1b, for example in accordance with the LTE-Advanced Pro standard or the 5G or NR, new radio, standard.

In mobile communication networks, for example in a network like that described above with reference to FIGS. 1a and 1b, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2I communication), for example roadside entities, like traffic lights and traffic signs, and vehicles communicating directly with pedestrians (V2P communications), also referred to as Pedestrian-UEs (P-UEs). Other UEs may not be vehicular related UEs and may comprise any of the above-mentioned devices. Such devices may also communicate directly with each other (D2D communication) using the SL interface and its defined channels.

When considering two UEs directly communicating with each other over the sidelink, both UEs may be served by the same base station so that the base station may provide sidelink configuration, resource allocation or assistance for the UEs. For example, both UEs may be within the coverage area of a base station, like one of the base stations depicted in FIG. 1b. This is referred to as an "in-coverage" scenario. Another scenario is referred to as an "out-of-coverage" scenario. It is noted that "out-of-coverage" does not mean that the two UEs are not within one of the cells depicted in FIG. 1b, rather, it means that these UEs may not be connected to a base station, for example, they are not in an RRC connected or RRC INACTIVE state, so that the UEs do not receive from the base station any sidelink configuration, resource allocation or assistance, and/or may be connected to the base station, but, for one or more reasons, the base station may not provide sidelink configuration, resource allocation or assistance for the UEs, and/or may be connected to the base station that may not support NR V2X services, e.g. GSM, UMTS, LTE base stations or WiFi access points.

When considering two UEs directly communicating with each other over the sidelink, e.g. using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs 202, 204 directly communicating with each other, are both connected to a base station 201. The base station gNB 201 has a coverage area that is schematically represented by the circle 200 which, basically, corresponds to the cell schematically represented in FIG. 1b. The UEs 202, 204 directly communicating with each other may include a first vehicle 202 (also referred to as a vehicular UE or V-UE) and a second vehicle 204 (also referred to as a vehicular UE or V-UE) both in the coverage area 200 of the base station gNB 201. Both vehicular UEs 202, 204 are connected to the base station gNB 201 and, in addition, they are connected directly with each other over their PC5 interface. The scheduling and/or interference management of the V2V traffic is assisted by the gNB 201 via control signaling over the Uu interface, which is the radio interface between the base station 201 and the UEs 202, 204. In other words, the gNB 201 provides SL configuration, resource allocation or assistance for the UEs 202, 204, and the gNB 201 assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs 206, 208, 210 directly communicating with each other are either not connected to a base station, although they may be physically within a cell, and thus in coverage of a base station of a wireless communication network, or some or all of the UEs 206, 208, 210 directly communicating with each other are connected to a base station but the base station does not provide any SL configuration, resource allocation or assistance. Three vehicular UEs 206, 208 and 210 are shown directly communicating with each other over a sidelink, e.g., using the PC5 interface. The scheduling and/or interference management of the V2V traffic is based on algorithms implemented between the vehicular UEs 206, 208, 210. This configuration is also referred to as a Mode 2 configuration in NR V2X or as a Mode 4 configuration in LTE V2X. As mentioned above, the scenario in FIG. 3 which is the out-of-coverage scenario does not necessarily mean that the respective Mode 2 UEs (in NR) or Mode 4 UEs (in LTE) are outside of the coverage 200 of a base station, rather, it means that the respective Mode 2 UEs (in NR) or Mode 4 UEs (in LTE) are not served by a base station, are not connected to the base station of the coverage area, or are connected to the base station but receive no SL configuration, resource allocation or assistance from the base station. Thus, there may be situations in which, within the coverage area 200 shown in FIG. 2, in addition to the NR Mode 1 or LTE Mode 3 UEs 202, 204 also NR Mode 2 or LTE Mode 4 UEs 206, 208, 210 are present.

It is noted that the information in the above section is only for enhancing the understanding of the background of the invention and therefore it may contain information that does not form known technology that is already known to a person of ordinary skill in the art.

Starting from known technology as described above, there may be a need for improvements in the resource allocation for communication in the sidelink.

SUMMARY

According to an embodiment, a transceiver being configured to participate in at least one communication service provided by a wireless communication network may have: a communication interface for receiving and/or transmitting communication data pertaining to the at least one communication service, wherein the transceiver is configured to transmit and/or receive the communication data pertaining to the at least one communication service if at least one of the following predetermined criteria is met: a) a current location of the transceiver is determined to be inside a designated geographical area being related to the at least one communication service, and/or b) the transceiver receives an intimation signal from a second service being different to the at least one communication service, and/or c) the transceiver receives communication data pertaining to the at least one communication service.

According to another embodiment, a method for operating a transceiver for participating in at least one communication service provided by a wireless communication network may have the step of: receiving and/or transmitting communication data pertaining to the at least one communication service, wherein the step of transmitting and/or receiving said communication data pertaining to the at least one communication service is enabled only if at least one of the following predetermined criteria is met: a) a current location of the transceiver is determined to be inside a designated geographical area being related to the at least one communication service, and/or b) an intimation signal from a second service being different to the at least one communication service is received, and/or c) communication data pertaining to the at least one communication service is received.

Another embodiment may have a non-transitory digital storage medium having stored thereon a computer program for performing a method for operating a transceiver for participating in at least one communication service provided by a wireless communication network having the step of: receiving and/or transmitting communication data pertaining to the at least one communication service, wherein the step of transmitting and/or receiving said communication data pertaining to the at least one communication service is enabled only if at least one of the following predetermined criteria is met: a) a current location of the transceiver is determined to be inside a designated geographical area being related to the at least one communication service, and/or b) an intimation signal from a second service being different to the at least one communication service is received, and/or c) communication data pertaining to the at least one communication service is received, when said computer program is run by a computer.

BRIEF DESCRIPTION OF THE DRAWINGS

Embodiments of the present invention are now described in further detail with reference to the accompanying drawings, in which.

DETAILED DESCRIPTION OF THE INVENTION

Figures 1A, 1B:
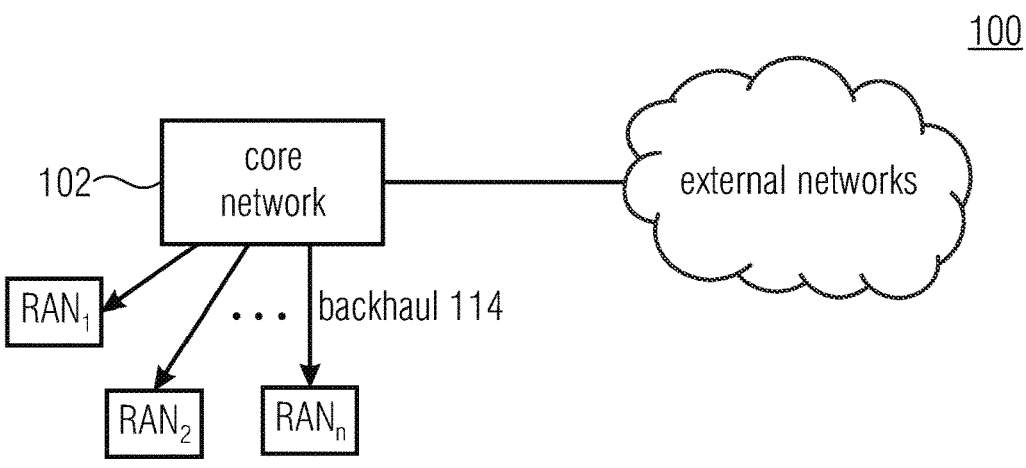
FIGS. 1*a*, 1*b* show schematic representations of an example of a wireless communication system.
Figure 2:
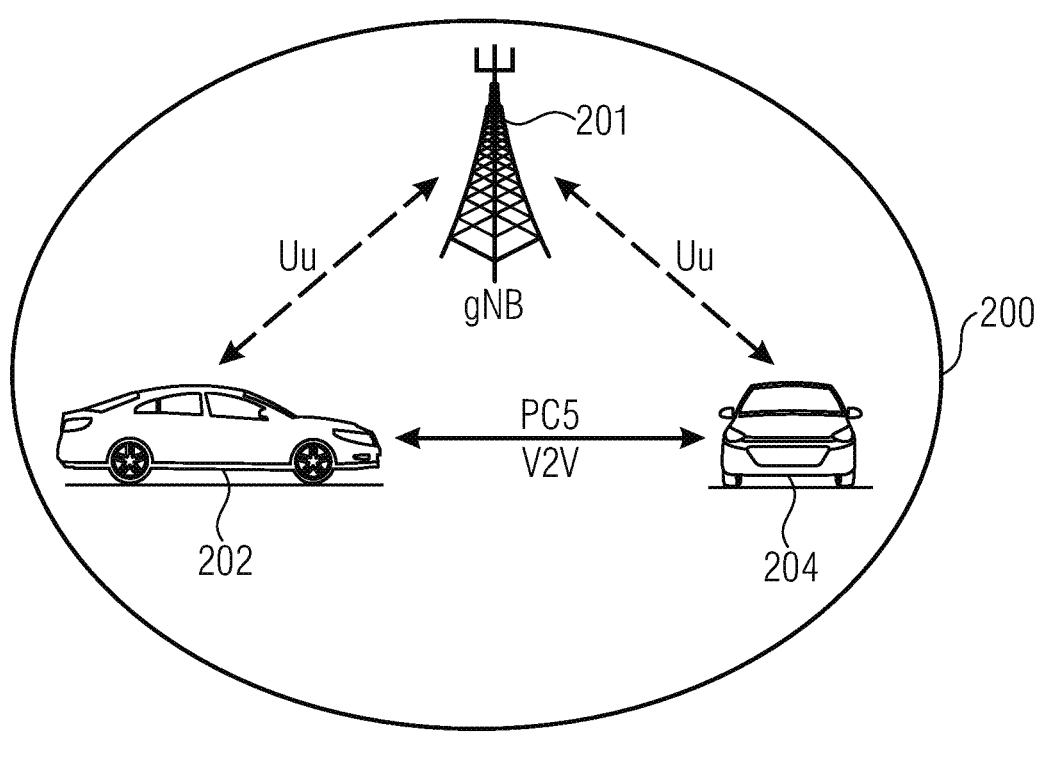
FIG. 2 is a schematic representation of an in-coverage scenario in which UEs directly communicating with each other are connected to a base station.
Figure 3:
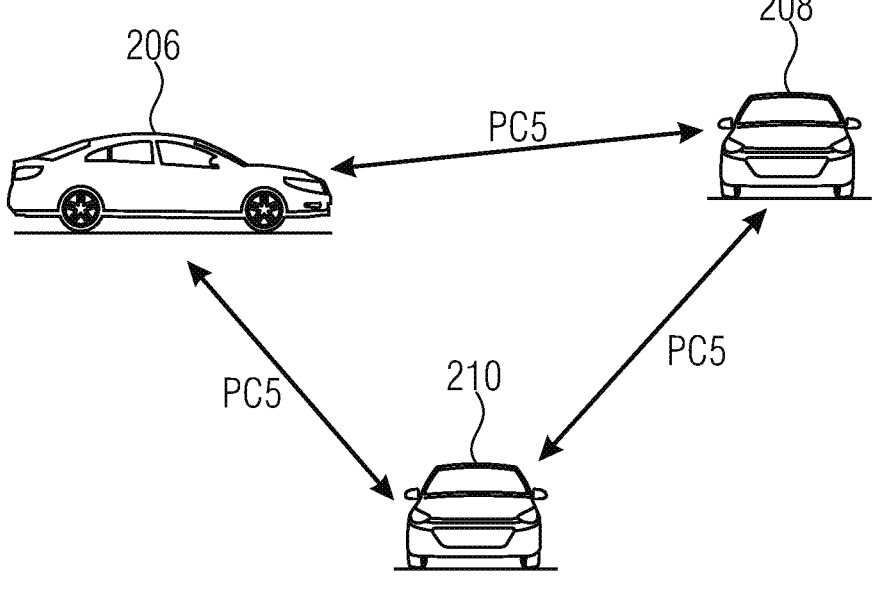
FIG. 3 is a schematic representation of an out-of-coverage scenario in which UEs directly communicating with each other receive no SL resource allocation configuration or assistance from a base station.

Equal or equivalent elements or elements with equal or equivalent functionality are denoted in the following description by equal or equivalent reference numerals.

Method steps which are depicted by means of a block diagram and which are described with reference to said block diagram may also be executed in an order different from the depicted and/or described order. Furthermore, method steps concerning a particular feature of a device may be replaceable with said feature of said device, and the other way around.

Figure 4:
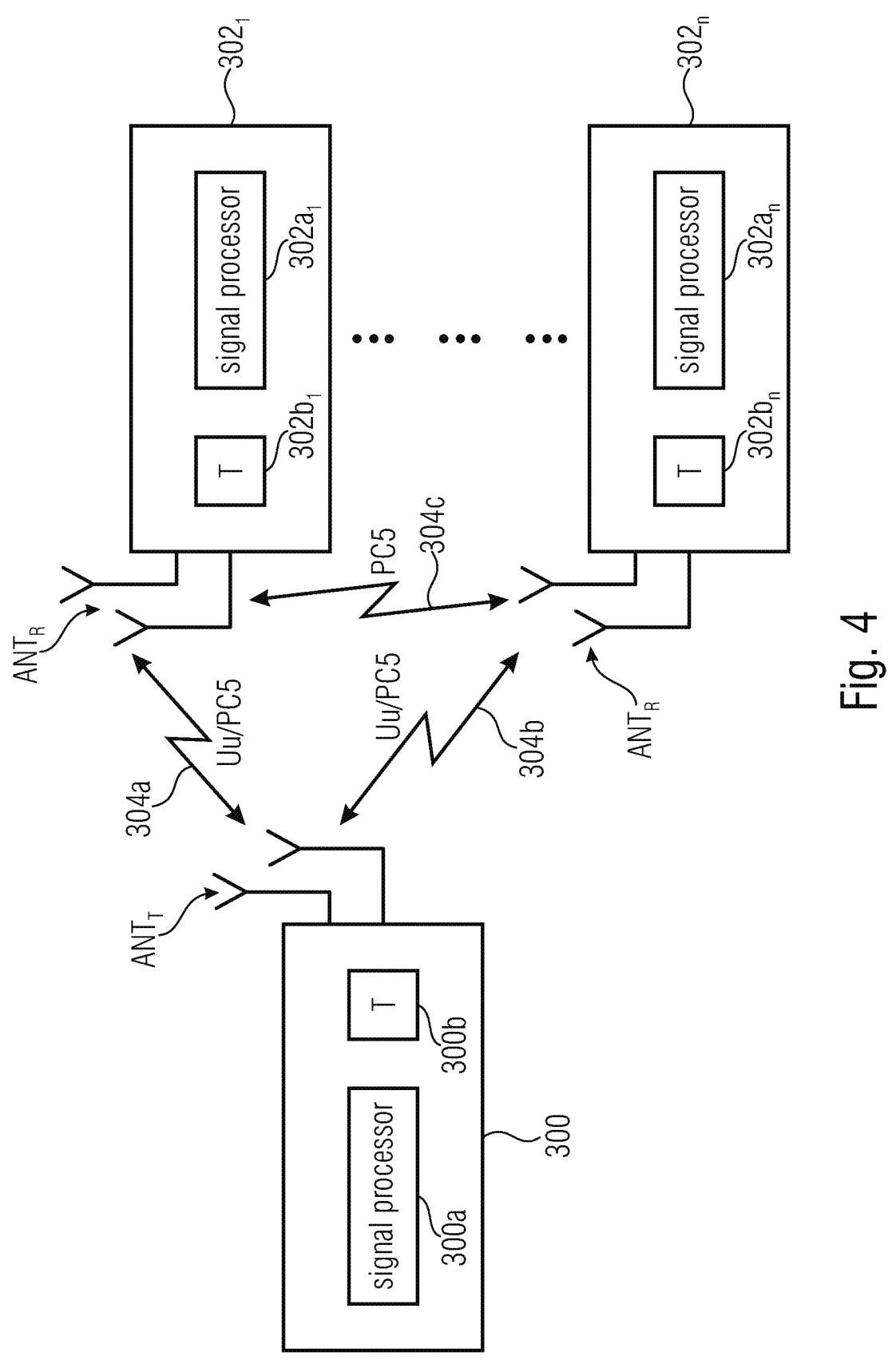
FIG. 4 is a schematic representation of a wireless communication system including a transmitter, like a base station, and one or more receivers, like user devices, UEs.

Embodiments of the present invention may be implemented in a wireless communication system as depicted in FIGS. 1*a*, 1*b*, 2 and 3 including base stations and users, like mobile terminals or IoT devices. FIG. 4 is a schematic representation of a wireless communication system including a transmitter 300, like a base station, and one or more receivers 3021 to 302*n*, like user devices, UEs. The transmitter 300 and the receivers 302 may communicate via one or more wireless communication links or channels 304*a*, 304*b*, 304*c*, like a radio link. The transmitter 300 may include one or more antennas $ANT_T$ or an antenna array having a plurality of antenna elements, a signal processor 300*a* and a transceiver 300*b*, coupled with each other. The receivers 302 include one or more antennas $ANT_R$ or an antenna array having a plurality of antennas, a signal processor 302*a*₁, 302*a*ₙ, and a transceiver 302*b*₁, 302*b*ₙ coupled with each other. The base station 300 and the UEs 302 may communicate via respective first wireless communication links 304*a* and 304*b*, like a radio link using the Uu interface, while the UEs 302 may communicate with each other via a second wireless communication link 304*c*, like a radio link using the PC5 interface. When the UEs are not served by the base station, are not be connected to a base station, for example, they are not in an RRC connected state, or, more generally, when no SL configuration, resource allocation or assistance is provided by a base station, the UEs may communicate with each other over the sidelink. The system, the one or more UEs 302 and the base stations may operate in accordance with the inventive teachings described herein.

The concept as described herein may concern a communication between user devices, called User Equipments—UEs—wherein said communication between two UEs, may also be referred to as a Device-to-Device—D2D—Communication or between at least one UE and a network entity, e.g. a base station, may also be referred to as a cellular communication. According to said concept, a UE may be enabled to participate in a communication being related to a first service (e.g. a type of D2D Communication), as well as with a communication being related to a different second service (e.g. a type of cellular communication). As a non-limiting example of the herein described concept, at least one communication service may comprise a D2D communication between a UE and at least one further UE, e.g. via sidelink. As a non-limiting example of the herein described concept, a second service may comprise a cellular communication, e.g. a communication between a UE and a base station, e.g. via Uu link. As a non-limiting example for the at least one communication service, Vehicle-to-Everything—V2X—Communication scenarios may be described between vehicular UEs and non-vehicular UEs. As a non-limiting example of a non-vehicular UE, so-called Pedestrian UEs (P-UEs) may be mentioned herein. Of course, other D2D Communications may be possible, and other types of UEs, like IoT (Internet of Things) devices, robots, drones, and many more may exploit the herein described concept.

In the non-limiting case of the at least one communication service, a plurality of such UEs may form a user device group, also referred to simply as group, and the communication within the group or among the group members may be performed via the sidelink interfaces between the user devices, like the PC5 interface. The concept described herein thus supports not only a direct D2D communication, it also supports broadcast, a UE addressing all UEs within reach, or groupcast communication. In groupcast communication, a UE may use special group IDs to convey information directly to a group of UEs within its communication range.

For example, the herein described scenarios of particular UEs using first and second services may be employed in the field of the transport industry in which one or more vehicles being equipped with vehicular UEs may be grouped together, for example, by a remote driving application. Other examples may comprise scenarios in which non-vehicular UEs (e.g. P-UEs) may communicate with vehicular UEs. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

In wireless communication systems or networks like those described above with reference to FIG. 1a, 1b, 2 or 3, a sidelink communication among the respective user devices may be implemented, for example a vehicle-to-vehicle communication, V2V, a vehicle-to-infrastructure communication, V2I, a vehicle-to-pedestrian communication, V2P, a vehicle-to-home communication, V2H, a vehicle-to-network communication, V2N, a vehicle-to-anything communication, V2X, or any D2D communication among any other user devices, e.g., among those mentioned above.

The initial vehicle-to-everything (V2X) specification was included in Release 14 of the 3GPP standard. This release included the definition of communication between vehicles and pedestrians as well. The definition of the resources to be used by the pedestrian UEs (P-UEs) as well as the procedures to be used for the selection of resources are specified in Rel. 14.

Although this feature was not included in Rel. 16 for NR V2X, it is envisioned that this will be covered in Rel. 17. With the new release and the updated requirements to enhance reliability, reduce latency and enable multicast/groupcast and unicast communications, there are a few issues with the existing implementation of P-UEs. In Rel. 14, P-UEs would essentially behave the same way as that of vehicles. They are used to monitor the selected resource pools at all time in order to receive transmissions from vehicles. This was acceptable for vehicles since they do not have any power efficiency issues, but that is not the case with P-UEs, which are essentially handsets or sensors with limited battery and power capabilities.

Having the P-UE to monitor all the resource pools across cast types and modes, even when the P-UE is away from roads, casts a burden on the power consumption of the P-UEs.

Furthermore, P-UEs can also be NR UEs with limited processing capabilities as in mid-tier NR devices, such as MTC-devices, NR Light devices, wearables etc. These devices include special power saving capabilities and thus should not monitor all V2X spectrum, as expected from NR V2X UEs. Although P-UEs stand for pedestrian UEs, the embodiments described are not limited to this scenario, but shall include use cases which involve the above-mentioned mid-tier devices.

In Rel. 14, pedestrian communications to vehicles, or P2X, procedures follow similar guidelines as that of normal V2X communications. P-UEs would receive resource pool configurations from the gNB, and are expected to select the relevant resource pool based on the zone concept and its location.

Once the P-UE is aware of the appropriate resource pools, it behaves the same way as that of a normal vehicular UE (V-UE). In Mode 3 in LTE or Mode 1 in NR V2X, it will request for resources from the gNB by sending a scheduling request and Buffer Status Report (BSR), by which the gNB will provide a DCI format, e.g. format 5a in LTE, which will contain information regarding the time-frequency resources to be used by the P-UE for transmission. The P-UE will then transmit an SCI with the location of the data resources to the relevant recipients.

Figure 5:
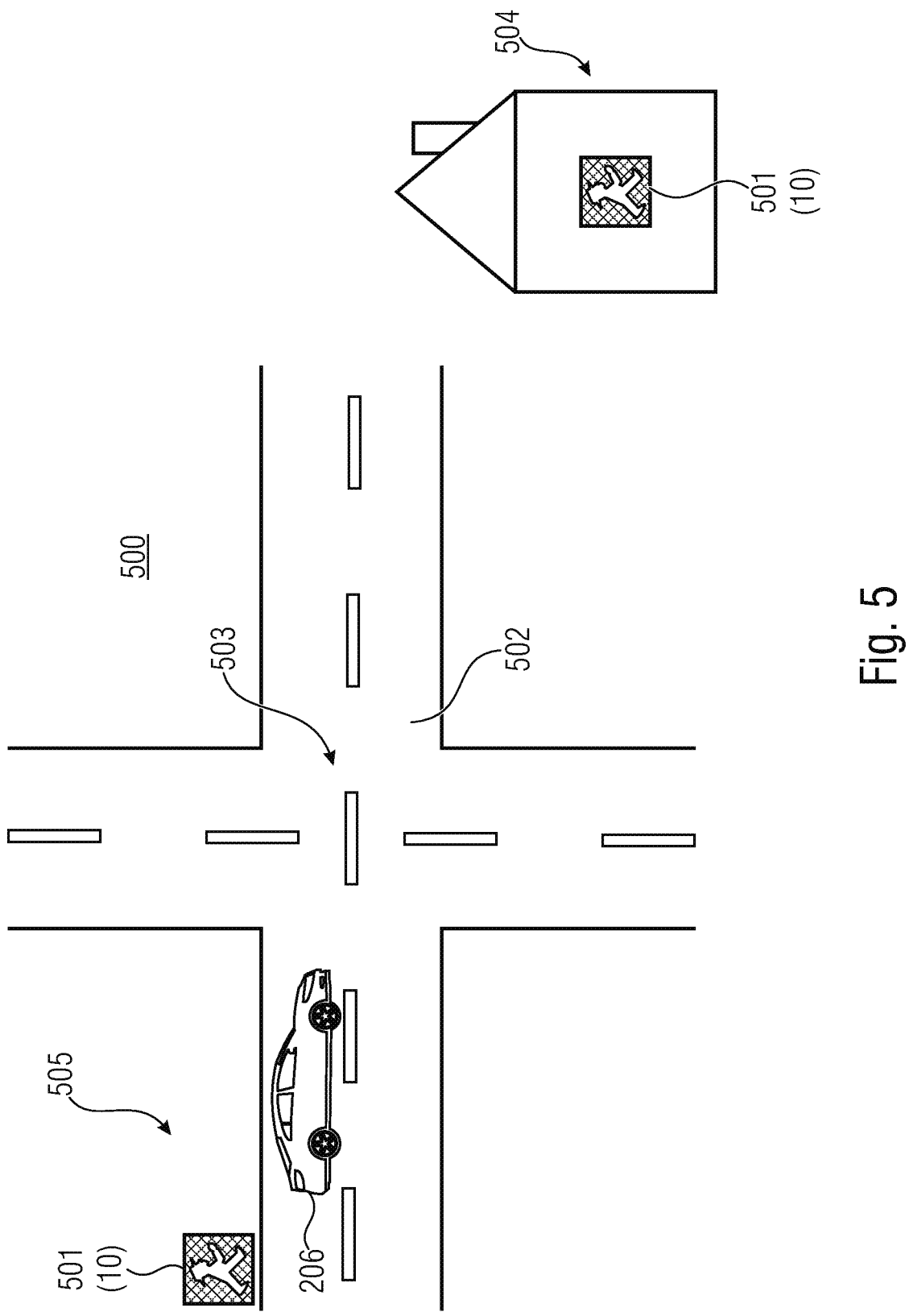
FIG. 5 is a schematic representation showing different embodiments of transceivers using at least one communication service when in proximity to a designated geographical area.

As exemplarily shown in FIG. 5, P-UEs 501 may operate in various indoor scenarios 504 and outdoor scenarios 505. The P-UEs 501 may also listen to the receive (RX) resource pools as defined for vehicular communications, and will receive transmissions by other P-UEs 501 or V-UEs 206 accordingly. This may be irrespective of the position of the P-UE 501, e.g. it can be indoors and completely away from any vehicular proximity, but is used to receive the transmissions made by other UEs. P-UEs 501 which are moving outdoors are expected to decode messages transmitted in RX resource pools and/or messages from other P-UEs 501 or V-UEs 206. Furthermore, there can be a special use case for P-UEs 501 which are inside an industrial manufacturing side, indoors, which have to listen to the RX-pools used in its vicinity, which are only used in a private network, e.g. a campus network, for industrial communications, e.g. as in an industrial IoT (IIoT) network. Here, a campus network is a separate NR network deployed for wireless communications which is separated from a commercial NR network, used for a nationwide NR deployment, like an industrial manufac-
turing site, or a secured public infrastructure (e.g. airport,
power plant, etc.).

Overview of the Concept

To generalize the above mentioned non-limiting example
of P-UEs 501 and V-UEs 206, it is imaginable that a UE in
general may be configured to make use of a communication
service that may or shall be permanently available, e.g. a
communication with a base station, e.g. using the Uu link.
According to the inventive principle, a UE may make use of
a further communication service that may not be perma-
nently but only conditionally available, and/or the UE may
use this further communication service only if one or more
predetermined conditions are fulfilled, which shall now be
described in detail.

In the following section, as non-limiting examples only,
different solutions are proposed to improve the efficiency of
P-UEs 501 based on their position and direction with respect
to other V-UEs 206. The P-UEs 501 may be configured with
the appropriate resource pools by the gNB or by a Road Side
Unit (RSU) or by a GL-UE (Group Leader UE) or by
another UE, but would transmit and receive only when in
particular locations.

Since, as mentioned above, the present invention is not
limited to P-UEs 501 and/or V-UEs 206, a transceiver may
be described in the following. Said transceiver may be
comprised by a UE, e.g. by a P-UE, a V-UE, an IoT device
or by any other device being capable of communicating with
one or more further devices, in particular via Uu link and/or
via sidelink, e.g. PC5.

Figure 6A:
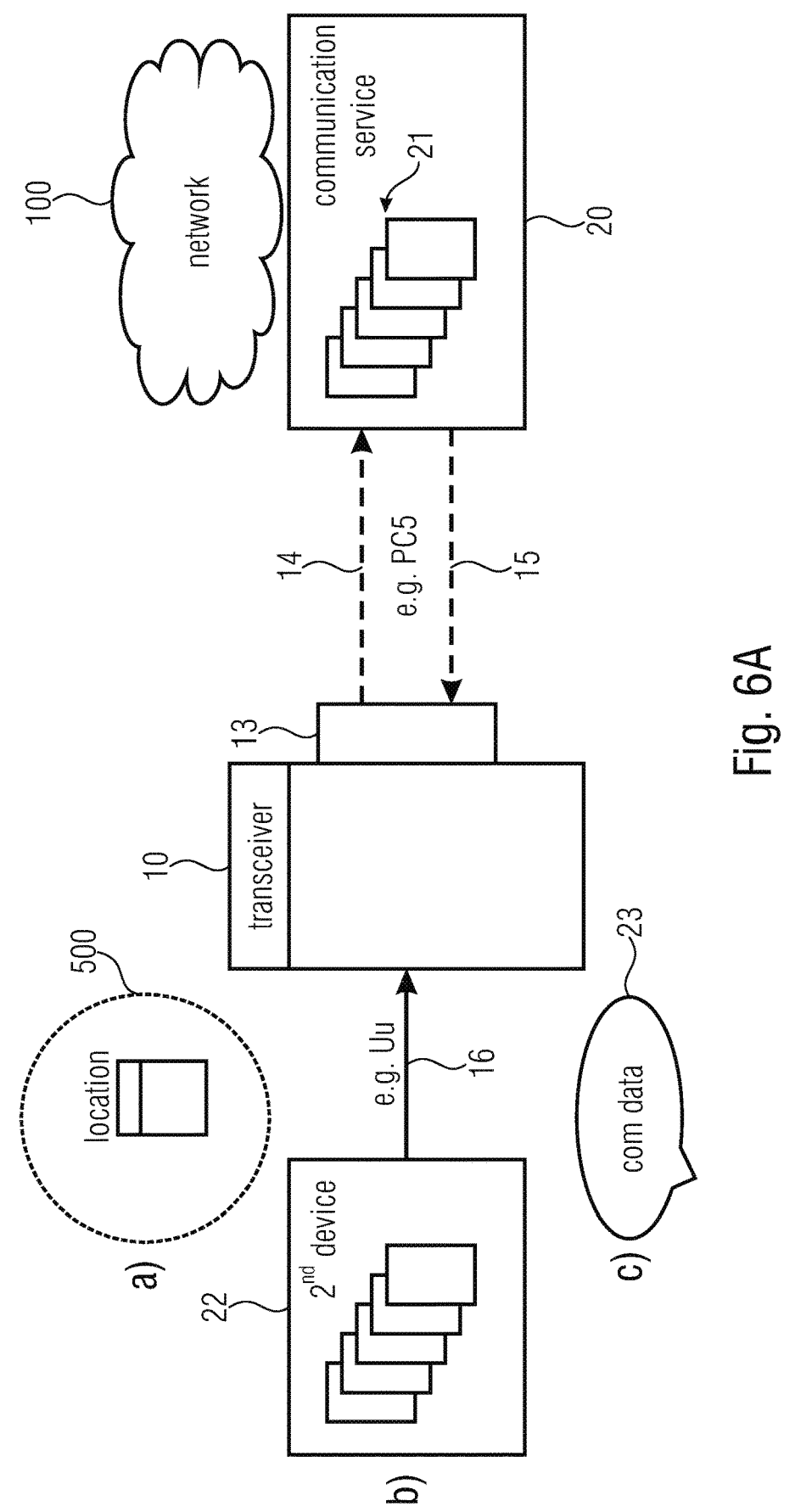
FIG. 6A is a schematic representation showing a transceiver according to the invention.

As shown in FIG. 6A, a first aspect of the invention
concerns a transceiver 10 for wireless communication in a
wireless communication network 100. In particular, the
transceiver 10 is configured to participate in at least one
communication service 20 provided by the wireless com-
munication network 100. One or more further transceivers
21 may be participants of the at least one communication
service 20.

The transceiver 10 comprises a communication interface
13 for receiving and/or transmitting communication data 14,
15 pertaining to the at least one communication service 20,
e.g. a vehicular communication or a communication with
any other transceiver 21, e.g. via sidelink, e.g. via PC5.

As mentioned above, the at least one communication
service 20 may only be conditionally available for the
transceiver 10, and/or the transceiver 10 may conditionally
use this at least one communication service 20, i.e. only if
one or more predetermined conditions are fulfilled. Thus, the
arrows 14, 15 representing transmitted and received com-
munication data, respectively, are depicted in dashed lines.
Accordingly, the transceiver 10 is configured to transmit
and/or receive the communication data 14, 15 pertaining to
the at least one communication service 20 only if at least one
of the following predetermined criteria is met:

a. a current location of the transceiver 10 is determined to
      be inside a designated geographical area 500 being
      related to the at least one communication service 20,
      and/or b. the transceiver 10 receives an intimation signal 16 from
      a second service 22 (e.g. a cellular communication by
      a base station 201), said second service 22 being
      different to the at least one communication service 20,
      and/or c. the transceiver 10 receives communication data 23
      pertaining to the at least one communication service 20,
      e.g. within a certain sensing window/time window.

Criterion a) and criterion c) shall be explained in more
detail somewhat later. Criterion b) foresees an intimation
signal 16. An intimation signal 16 may, for example, com-
prise a notification notifying the transceiver 10 that the at
least one communication service 20 is available and that the
transceiver 10 should transmit and/or receive communica-
tion data using the at least one communication service 20.
Additionally or alternatively, an intimation signal 16 may
comprise, for example, configuration data for configuring
the transceiver 10, and/or resource allocation information
for transceiver 10, to participate in the at least one commu-
nication service 20.

As mentioned above, the transceiver 10 may receive the
intimation signal 16 from the second service 22. The second
service 22 may be a communication service of a different
type than the at least one communication service 20. For
example, the second service 22 may be a permanently
available communication service, e.g. a communication
service provided by a base station 201 for communicating
with the base station 201, e.g. via Uu link.

The intimation signal 16 may be provided to the trans-
ceiver 10 from the second service 22. The intimation signal
16 may comprise an explicit signal, e.g. an explicit trigger
or a broadcast signal via MIB/SIB or a groupcast signal,
received by the transceiver 10, triggering the transceiver 10
to receive and/or transmit the communication data 14, 15
pertaining to the at least one communication service 20.
Additionally or alternatively, the intimation signal 16 may
comprise a resource allocation information within config-
ured resources received by the transceiver 10 for explicitly
configuring the transceiver 10 to receive and/or transmit the
communication data 20 pertaining to the at least one com-
munication service 20.

According to criterion c), the transceiver 10 may be
configured to receive communication data 23 pertaining to
the at least one communication service 20. This may be
communication data 23 different from communication data
14, 15 depicted in FIG. 6A. For example, the communica-
tion data 23 pertaining to the at least one communication
service 20 may have been transmitted before the transceiver
10 was enabled to participate in the at least one communi-
cation service. The communication data 14, 15, instead, may
be communication data which may have been received
and/or transmitted by the transceiver 10 after the transceiver
was enabled to participate in the at least one communication
service. This one of the differences between the communi-
cation data 23 and the communication data 14, 15. The
transceiver 10 may be enabled to participate in the at least
one communication service 20 only upon receipt of the
communication data 23.

According to an example, the received communication
data (23) pertaining to the at least one communication
service (20) is received within a predetermined time window, and/or within a predetermined frequency range, e.g. within a
      bandwidth part (BWP) or resource pool (RP), and/or in more than one instance of transmissions, and/or within a pre-defined message type Regarding the pre-defined message type, it may be pos-
sible, as a non-limiting example, that the transceiver 10 may
only respond to other V2X messages but not to other P-UE
messages, or only respond to certain V2X messages, e.g.
messages with high priority such as emergency messages
such as sensor failure.

Definition of the Geographical Area

The above mentioned designated geographical area 500 being related to the at least one communication service 20 may be at least one of:

a spatial vicinity to at least one of the one or more further transceivers 21 being related to the at least one communication service 20, a spatial area related to the at least one communication service 20, an infrastructure, for example a traffic infrastructure, being related to the at least one communication service 20, a spatial vicinity to a road (502), a spatial vicinity to an intersection (503), a spatial vicinity to a road construction site, a spatial vicinity to a roadside furniture, e.g. lamp post, guard rail, etc., a spatial vicinity to a vehicular User Equipment, a spatial vicinity to hazardous areas on industrial sites, e.g. vicinity to automated machines on a factory floor, etc., a position within a communication range of at least one of the one or more further transceivers 21 being related to the at least one communication service 20, a position within a configured minimum used communication range of at least one of the one or more further transceivers 21 being related to the at least one communication service 20, a spatial vicinity to an infrastructure device, for example a road-side unit (RSU), a position within a communication range of an infrastructure device, for example a road-side unit (RSU)

A traffic infrastructure may also be a private infrastructure (e.g. campus network), like an industrial manufacturing site, or a secured public infrastructure (e.g. airport, power plant, etc.).

For example, as shown in FIG. 5, a P-UE 501 may determine whether it is in such a designated geographical area 500, e.g. in vicinity of a traffic related scenario, e.g. in vicinity of a road 502, an intersection 503, a V-UE 206 and the like.

According to an embodiment, the transceiver 10 (e.g. comprised by a P-UE 501) may be configured to determine whether it is inside the designated geographical area 500 by sensing (e.g. periodically or depending on motion state of the transceiver 10) for a presence of any communication data 23 being related to the at least one communication service 20. That is, if the transceiver 10 may detect such communication data 23 (e.g. a V2X message), the transceiver 10 may derive therefrom that it is located inside the designated geographical area 500 (e.g. near a road 502).

The transceiver 10 may further be configured to determine whether it is inside the designated geographical area 500 by determining its position, e.g. by means of GNSS, Cellular localization, WiFi assisted positioning, and the like.

For example, the transceiver 10 may be configured to determine its position by using at least one of:

GNSS

Cellular localization

WiFi-based assisted positioning

Fingerprinting using a wireless radio technology a mechanism according to which the transceiver 10 gets its position signaled from the network 100, or from another transceiver, e.g. from another UE (e.g. a smart watch may not have a built-in GPS but may get told by an external device, e.g. by a smart phone, what its position is), either as position data or as an indicator whether the transceiver 10 is inside the designated geographical area 500 or not.

It is to be mentioned that the network 100 can be the base station 201, another UE 21 (e.g. vehicular UE), an entity within the core network (e.g. V2X-server within the core network), or over-the-top (OTT) from the Internet.

For example, the transceiver 10 may be configured to determine whether it is inside the designated geographical area 500 by a direct or an indirect indication from the network 100. A direct indication may be, for instance, RRC, DCI, SIB, group/broadcast indicating a safe zone or disabling of a P-UE functionality. An indirect indication may be, for instance, assistance information from the network 100 helping the transceiver 10 to determine whether it is inside the designated geographical area 500, e.g. messaging of a safe area around the base station (measurements (e.g. pathloss), beam information or timing advance to allow the transceiver to determine whether it is part of the designated geographical area 500.

According to such an embodiment, the transceiver 10 may be configured to determine whether it is inside the designated geographical area 500 by at least one of the following methods:

a direct or an indirect indication from the network (100), a direct or an indirect indication from an external application which resides within the transceiver (10), e.g. a pre-stored application, or which does not reside within the transceiver (10), e.g. an Internet application.

The above mentioned indirect indication from an external application may be a pre-stored layout of the designated geographical area 500, e.g. geo-fencing.

Examples of the at Least One Communication Service

As mentioned above, according to an example, the transceiver 10 may comprise a sidelink communication interface, wherein the at least one communication service 20 may comprise a communication between the transceiver 10 and at least one of the one or more further transceivers 21 being related to the at least one communication service 20 via its sidelink communication interface.

According to a non-limiting example, the at least one communication service 20 may comprise a communication using a Device-to-Device (D2D) communication protocol, for example a Vehicle-to-Everything (V2X) communication protocol which includes Vehicle-to-Pedestrian communication, involving communication with Pedestrian UEs (P-UEs). A further example for Device-to-Device (D2D) communication would be a Vehicle-to-Infrastructure (V2I) communication.

D2D communication may be executed by the transceiver 10 via its communication interface 13, which may comprise a sidelink interface, e.g. a PC5 interface. For example, the transceiver 10 may comprises a sidelink communication interface 13, for example a PC5-interface, and the at least one communication service 20 may comprise a communication between the transceiver 10 and at least one or more further transceivers 21 being related to the at least one communication service 20 via its sidelink communication interface 13. The transceiver 10 may be configured to receive a resource configuration comprising configuration information for configuring the sidelink communication interface 13.

According to an example, the one or more transceivers 21 being related to the at least one communication service 20 may comprise at least one vehicular User Equipment. Accordingly, these one or more transceivers 21 may be vehicular UEs being related to V2X services.

The second service 22 may comprise a communication with one or more base stations 201, and/or with one or more further transceivers (not shown) being related to the second service 22, e.g. via a further PC5-interface. For example, the one or more transceivers being related to the second service 22 may comprise at least one base station 201 and/or at least one User Equipment.

The invention may also concern a respective base station 201, e.g. a base station 201 for a wireless communication network 100. The base station 201 may be configured to provide to at least one transceiver 10 a resource configuration being related to at least one communication service 20 and/or one or more resources being related to the at least one communication service 20. Said resource configuration comprises configuration information for the at least one transceiver 10 for configuring a communication interface of the at least one transceiver 10 so as to participate in a communication with one or more further transceivers 21 being related to the at least one communication service 20. Said one or more resources may be used by the at least one transceiver 10 for participating in said communication with the one or more further transceivers 21.

The inventive base station 201 may be configured to provide said resource configuration to the at least one transceiver 10 if a current location of the at least one transceiver 10 is determined to be inside or outside a designated geographical area 500 being related to the at least one communication service 20. Additionally or alternatively, the base station 201 may be configured to provide said one or more resources to the at least one transceiver 10 only if a current location of the at least one transceiver 10 is determined to be inside or in spatial vicinity of the designated geographical area 500 being related to the at least one communication service 20.

The base station 201 may be configured to provide the resource configuration and/or the one or more resources for the at least one communication service 20 by means of a second service 22 being different from that at least one communication service 20. The second service 22 may be a communication service, e.g. for enabling a communication between the transceiver 10 and the base station 201, e.g. via Uu link.

The base station 201 may send an intimation signal 16 to the transceiver 10 via the second service 22, as described further above.

Idea 1: Enabling/Disabling of P-UE Communications Based on Location and/or Mobility State In this concept, it is proposed that a transceiver 10, e.g. a P-UE, may transmit and/or receive communications related to the at least one communication service 20, e.g. V2X communications, only when it is in proximity of the designated geographical area 500, for instance roads 502, intersections 503 and other potentially high-risk areas which may be somehow concerned with traffic in general.

In order to increase the power and battery usage of a P-UE 10, it is advantageous for the P-UEs 10 to transmit and receive V2X communications only when in proximity with roads 502, intersections 503 and other potentially high-risk areas. In order to achieve this, the P-UE 10 may receive the resource pool configurations from the gNB 201 but will not transmit or receive in the resources unless it is in proximity of the designated geographical area 500, e.g. in vehicular proximity.

This can be achieved by the UE 10 making use of advanced positioning techniques such that the V2X application running on the P-UE 10 will be aware of the roads 502, intersections 503 and other areas of vehicular proximity. Only when in these areas, the P-UE 10 will request for resources from the gNB 201 for transmission of its location to other transceivers 21 being related to the at least one communication service 20, e.g. to other V-UEs 21 and/or P-UEs 21.

According to an embodiment, the transceiver 10 may comprise a location determination unit configured to determine the current location of the transceiver 10 and to determine, based on said current location, whether the transceiver 10 is inside the designated geographical area 500 being related to the at least one communication service 20. Additionally or alternatively, the transceiver 10 may comprise a mobility state determination unit configured to determine a current mobility state of the transceiver 10 and to determine, based on said current mobility state, whether the transceiver 10 is inside the designated geographical area 500 being related to the at least one communication service 20. Still further additionally or alternatively, the transceiver 10 may be configured to sense for the presence of any communication data 23 being related to the at least one communication service 20 and to determine whether the transceiver 10 is inside the designated geographical area 500 being related to the at least one communication service 20 if such communication data 23 was successfully detected.

According to a yet further example, the transceiver 10 may comprise a mobility state determination unit configured to determine a current mobility state of the transceiver 10 and to determine, based on said current mobility state, whether the transceiver 10 is in a mobility state from which the transceiver 10 may derive that it is enabled to participate in the at least one communication service (20). For example, a transceiver 10 may only transmit if the transceiver 10 (e.g. a P-UE) is currently moving or was recently moving some time ago.

According to such an example, the transceiver 10 may be configured to actively request a resource configuration and/or one or more resources for the at least one communication service 20 from a base station 201:

if the current location of the transceiver 10 is determined to be inside the designated geographical area 500 being related to the at least one communication service 20, and/or if the transceiver 10 successfully received communication data 23 being related to the at least one communication service 20.

In other words, the transmitter 10 may successfully receive communication data being related to the at least one communication service 20, e.g. V2X communication data, only after it has received the resource configuration from the base station 201. The resource configuration contains a large set of resources called resource pools. When a transceiver 10 receives this configuration, it can listen to the pool to check for incoming transmissions. It can also request the base station for resources within this pool for a transmission of its own, which is what the above scenario may describe.

In another scenario, the transceiver 10 may not be connected to any application related to the at least one communication service 20, e.g. to any V2X application, by default but only if activated by the network 100 or by the gNB 201, e.g. using RRC signaling (P-UE-configuration: P-UE=on). The network 100 and/or gNB 201 may keep track of the transceiver's 10 location, or other sensor data with respect to the mobility state of the given transceiver 10, possibly provided by the transceiver 10 to the network 100, connected to a network 100 (e.g. accelerometer, direction, speed etc.) automatically activates the P-UE mode once the transceiver 10 gets close to the potential risk areas 500. This would trigger the transceiver 10 to ask for resources in the Buffer Status Report (BSR) for a regular beacon transmission or the gNB 201 would configure a grant (CG) with an appropriate periodicity without any explicit request of the transceiver 10. If a device or a network 100 is capable of detecting the indoor/outdoor state of a transceiver 10, this can be used to enable/disable the P-UE communication by e.g. signaling to the transceiver 10.

According to an embodiment, the transceiver 10 may be configured to receive a configuration message from a base station 201 and/or from the network 100, the configuration message comprising a requested resource configuration and/or one or more requested resources for the at least one communication service 20, wherein the transceiver 10 may be configured to receive the configuration message when the transceiver 10 is inside the designated geographical area 500, and to make use of the resource configuration and/or the one more resources for the at least one communication service 20, when the transceiver 10 is inside the designated geographical area 500, or wherein the transceiver 10 may be configured to receive the configuration message before the transceiver 10 enters the designated geographical area 500, and to refrain from using the resource configuration and/or the one or more resources for the at least one communication service 20 before the transceiver 10 is inside the designated geographical area 500.

Accordingly, it may be possible for the transceiver 10 to have received the RP (Resource Pool) configurations beforehand, but chooses to transmit and/or receive on these resources when it enters or when it is located inside the designated geographical area 500.

The corresponding inventive base station 201 may be configured to receive a resource configuration request message from said at least one transceiver 10 when the current location of said at least one transceiver 10 is determined to be inside or in spatial vicinity to the geographical area 500 being related to the at least one communication service 20. Furthermore, the base station 201 may be configured to provide a resource configuration for the at least one communication service 20 to said at least one transceiver 10 in response to the received resource configuration request message The corresponding inventive base station 201 may further be configured to transmit a resource configuration response message to the at least one transceiver 10 when the at least one transceiver 10 is inside or in spatial vicinity to the designated geographical area 500, the resource configuration response message comprising the requested resource configuration.

Additionally or alternatively, the base station 201 may be configured to first provide the requested resource configuration, and afterwards provide one or more dedicated resources. Accordingly, the base station 201 may be configured to provide to the at least one transceiver 10 the requested resource configuration for the at least one communication service 20 when the location of the at least one transceiver 10 is determined to be outside the designated geographical area 500, and to allocate to the at least one transceiver 10 dedicated resources from the resource configuration upon receipt of the resource configuration request message when the at least one transceiver 10 is inside or in spatial vicinity to the designated geographical area 500.

For transmitting the one or more dedicated resources to the at least one transceiver 10, the base station 201 may be configured to receive a resource request message from said at least one transceiver 10 when the current location of said at least one transceiver 10 is determined to be inside or in spatial vicinity to the geographical area 500 being related to the at least one communication service 20. The resource request message comprises a request for one or more dedicated resources being related to the at least one communication service 20.

In response, the base station 201 may transmit a resource response message to the at least one transceiver 10 when the at least one transceiver 10 is inside or in spatial vicinity to the designated geographical area 500. The resource response message comprises the requested one or more dedicated resources for the at least one communication service 20.

As mentioned above, the transceiver 10 may comprise at least one sensor for generating sensor data being related to a current mobility state of the transceiver 10. The transceiver 10 may be configured to provide said sensor data to a base station 201 or to the network 100. The transceiver 100 may further be configured to receive a requested resource configuration for the at least one communication service 20 from the base station 201 and/or from the network 100, in case the base station 201 and/or the network 100 determines, based on the sensor data, that the transceiver 10 is inside the designated geographical area 500 being related to the at least one communication service 20.

Additionally or alternatively, the transceiver 10 may be configured to provide said sensor data to a base station 20) or to the network 100, and the transceiver 10 may be configured to receive requested one or more resources for the at least one communication service 20 from the base station 201 and/or from the network 100, in case the base station 201 and/or the network 100 determines, based on the sensor data, that the transceiver 10 is inside the designated geographical area 500 being related to the at least one communication service 20, or in case the transceiver 10 successfully received communication data being related to the at least one communication service 20.

According to an embodiment, the transceiver 10 may be configured to determine whether it is located indoors or outdoors. The transceiver 10 may be configured to transmit and/or receive communication data 14, 15 being related to the at least one communication service 20 only when the current location of the transceiver 10 is determined to be outdoors. Additionally or alternatively, the transceiver 10 may be configured to only receive but not to transmit communication data 14, 15 being related to the at least one communication service 20 when the current location of the transceiver 10 is determined to be indoors.

The base station 201 may notify the transceiver 10 about its indoor or outdoor state. For example, the transceiver 10 may be configured to determine whether it is located indoors or outdoors by receiving a notification from a base station 201 or from the network 100 indicating to the transceiver 10 whether it is connected to an indoor base station or to an outdoor base station.

Additionally or alternatively, the transceiver 10 may be configured to determine whether it is part of a predetermined geographical area, e.g. a predetermined geographical area that may be different from the geographical area 500 being related to the at least one communication service 20. For example, the predetermined geographical area may be a geographical area that is not related to the at least one communication service 20. For example, the transceiver 10 may be comprised by a base station which may be located inside a park, which is outdoors but which may not be related to the at least one communication service 20, e.g. to a V2X communication service. According to this embodiment, if the transceiver 10 may determine that it is part of such a predetermined geographical area, the transceiver 10 may only receive but not transmit communication data 14, 15 being related to the at least one communication service 20, or the transceiver 10 may actively refrain from receiving and/or transmitting communication data 14, 15 being related to the at least one communication service 20.

As mentioned above, the base station 201 may be configured to keep track of the current location of the at least one transceiver 10 in order to determine when the at least one transceiver 10 is inside or in spatial vicinity to the designated geographical area 500 being related to the at least one communication service 20.

As mentioned above, the base station 201 may be configured to receive sensor data from the at least one transceiver 10, wherein said sensor data may be related to a current mobility state of the at least one transceiver 10, e.g. related to an acceleration, speed, direction, height, etc. Based on said sensor data, the base station 201 may be configured to determine if and/or when the at least one transceiver 10 is located inside or in spatial vicinity to the designated geographical area 500 being related to the at least one communication service 20.

The base station 201 may further be configured to transmit a notification to the at least one transceiver 10, the notification indicating towards the at least one transceiver 10 whether it is connected to an indoor base station or to an outdoor base station so as to determine whether the at least one transceiver 10 is located indoors or outdoors.

If the current location of the at least one transceiver 10 is determined to be outdoors, the base station 201 may be configured to transmit a resource configuration and/or one or more resources for the at least one communication service 20 to the at least one transceiver 10 enabling the transceiver 10 to transmit and/or receive communication data 14, 15 being related to the at least one communication service 20.

Additionally or alternatively, if the current location of the at least one transceiver 10 is determined to be indoors, the base station 201 may be configured to transmit said resource configuration and/or said one or more resources to the at least one transceiver 10 enabling the at least one transceiver 10 to only receive but not to transmit communication data 14, 15 being related to the at least one communication service 20.

Figure 6B:
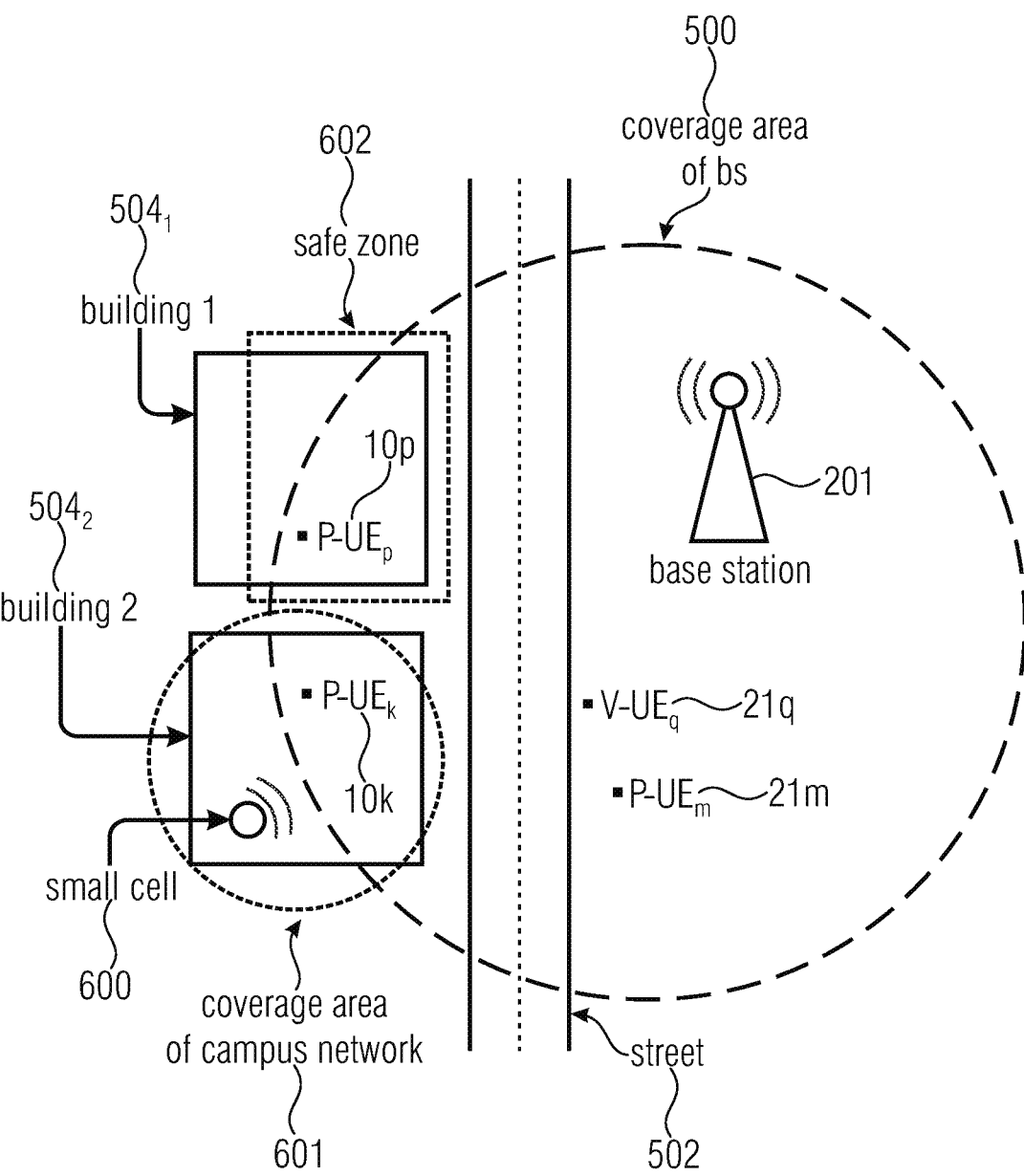
FIG. 6B is a schematic representation showing different scenarios for using at least one communication service with a transceiver according to the present invention.

FIG. 6B shows some non-limiting examples of indoor and outdoor scenarios. A base station 201 comprises a coverage area. The coverage area may define at least a portion of the designated geographical area 500. As can be seen, a street 502 runs through the coverage area of the base station 201. Those portions of the street 502 which are in coverage of the base station 201 may define said at least one portion of the designated geographical area 500.

Two transceivers $21_q$, $21_m$ being related to the at least one communication service 20 are shown in coverage of the base station 201. One transceiver $21_q$ may be comprised by a V-UE, while another transceiver $21_m$ may be comprised by a P-UE.

A first inventive transceiver $10_p$ may be in coverage of the base station 201, but inside a building 5041. A second inventive transceiver $10_k$ may also be located inside a building 5042. A small cell 600 may provide cellular coverage inside said building 5042. Said small cell 600 may provide a so-called campus network. A campus network may be a privately operated network, e.g. it can support all kinds of QoS without the limit of net neutrality or support of emergency calls, which is mandatory for public wireless networks. For example, a campus network, campus area network, corporate area network or CAN can be a computer network made up of an interconnection of local area networks (LANs) within a limited geographical area. The networking equipments (switches, routers) and transmission media (optical fiber, copper plant, Cat5 cabling etc.) are almost entirely owned by the campus tenant/owner: e.g. an enterprise, university, government etc. A campus area network may be larger than a local area network but smaller than a metropolitan area network (MAN) or wide area network (WAN). Optionally, the second inventive transceiver $10_k$ may additionally also be in coverage of the base station 201. The coverage area 601 of the campus network provided by the small cell 600 and the coverage area 500 of the base station 201 may overlap, as exemplarily shown in FIG. 6B.

As mentioned above, the network entity, e.g. a base station/NR-U base station 201, may indicate via messaging (broadcast, MIB, SIB, RRC, multicast) to a transceiver 10, e.g. to a P-UE $10_p$, $10_k$, that it is connected to an indoor base station. If the indoor/outdoor status cannot be detected directly, the base station 201 can define a "safe zone" 602, for example based on the pathloss/reception strength, meaning that if a transceiver $10_p$ may have a pathloss (PL)>x dBm, it may be treated as within a "safe zone" 602 and thus is too far away from the base station 201. Consequently, the transceiver $10_p$ is "safe" and thus does not need to transmit/receive communication data 14, 15 being related to the at least one communication service 20, e.g. SL messages. On the other side, if the pathloss is below a threshold, the transceiver 10 is outside the "safe zone" (see, e.g., P-UE $21_m$) and has to act as a P-UE or use other sensor data to detect if it has to act as a P-UE. Furthermore, the P-UE can be in-coverage of the above mentioned campus network (indoors or outdoors), which configured the said P-UE $10_k$ to decode the appropriate RPs and/or V-UE messages accordingly.

Thus, according to an exemplary embodiment, a transceiver 10 may be located inside or outside such a "safe zone" 602. For example, the transceiver 10 may be configured to determine that it is inside said "safe zone" 602 if the transceiver 10 has a path loss that is above a predetermined threshold. Then, the transceiver 10 may be configured to actively refrain from receiving and/or transmitting communication data 14, 15 being related to the at least one communication service 20.

Additionally or alternatively, the transceiver 10 may be configured to determine that it is outside said "safe zone" 602 if the transceiver 10 has a path loss that is below a predetermined threshold. Then, the transceiver 10 may be configured to transmit and/or receive communication data 14, 15 being related to the at least one communication service 20.

A further embodiment may concern the above mentioned campus network. According to such an embodiment, if the transceiver 10 is in coverage of a separate campus network, the transceiver 10 may be configured not to receive and/or transmit communication data being related to the at least one communication service 20 when the current location of the transceiver 10 is determined to be indoors, for example if the at least one communication service 20 may be related with services being primarily provided outdoors, e.g. vehicular (V2X) services or the like. For example, the transceiver 10 may be comprised by a P-UE, which when indoors doesn't need to transmit and/or receive V2X data.

Alternatively, the transceiver 10 may be configured to receive and/or transmit communication data being related to the at least one communication service 20 even if the current location of the transceiver 10 is determined to be indoors, for example if the at least one communication service 20 may be related with services being primarily provided indoors, e.g. for robots or the like.

Also the corresponding inventive base station 201 may be configured to determine whether the at least one transceiver 10 is inside or outside the above mentioned "safe zone" 602, e.g. by means of the above mentioned path loss threshold.

For example, if the base station 201 determines that the at least one transceiver 10 has a path loss that is above a predetermined threshold, then the base station 201 may be configured to transmit a resource configuration and/or one or more resources for the at least one communication service 20 to the at least one transceiver 10 enabling the at least one transceiver 10 to actively refrain from receiving and/or transmitting communication data 14, 15 being related to the at least one communication service 20.

If the base station 201 instead determines that the at least one transceiver 10 has a path loss that is below a predetermined threshold, then the base station 201 is configured to transmit said resource configuration and/or said one or more resources to the at least one transceiver 10 enabling the at least one transceiver 10 to transmit and/or receive communication data 14, 15 being related to the at least one communication service 20.

Idea 2: gNB Proactively Provides Resources for Transmission Once P-UE Enters Vehicular Proximity In this idea, it is proposed that since the gNB 201 may be aware of the location of the transceiver 10, e.g. P-UEs, instead of the transceiver 10 requesting for resources for a transmission which is essentially its location (an "I am here" message) to be broadcasted to all other transceivers 21, e.g. V-UEs, in the vicinity, the gNB 201 may proactively provide resources for this transmission.

As mentioned in the previous section, the transceiver 10, e.g. a P-UE, may request for resources for broadcasting or multicasting or unicasting its location only when in vicinity of the designated geographical area 500, e.g. when in vehicular proximity. However, this can be made more efficient if the gNB 201 can also be aware of the presence of the transceiver 10 in these designated geographical areas 500, e.g. in vehicular proximity. Since the transceiver 10 may periodically send its location to the gNB 201, the gNB 201 may proactively send resources to the transceiver 10 for the transmission of its location. It may, of course, be of advantage if the gNB 201 is aware of the designated geographical areas 500, e.g. of areas of vehicular proximity.

In a further embodiment, the transceiver 10 may also be configured to only report if a certain condition is triggered. The condition can be a physical distance to the last report, or a change in the mobility state or change of direction (motion vector) or a change in the indoor/outdoor state, or any combination of the listed examples combined with a timer function. This is configurable by a base station 201, a network 100 or another UE 21, e.g. GL-UE.

According to an embodiment, the transceiver 10 may be configured to periodically transmit information about its current location to a base station 201. If the information about its current location indicates towards the base station 201 that the transceiver 10 is inside the designated geographical area 500 being related to the at least one communication service 20, then the transceiver 10 may be configured to receive a resource configuration related to the at least one communication service 20 pro-actively from the base station 201 without previously sending an explicit resource configuration request message to the base station 201.

Additionally or alternatively, the transceiver 10 may have previously received a resource configuration being related to the at least one communication service 20, and the transceiver 10 may then request one or more dedicated resources from the resource configuration.

According to such an example, the transceiver 10 may be configured to periodically transmit information about its current location to a base station 201. If the information about its current location indicates towards the base station 201 that the transceiver 10 is inside the designated geographical area 500 being related to the at least one communication service 20, and if the transceiver 10 previously received a resource configuration related to the at least one communication service 20, then the transceiver 10 may receive one or more resources for the at least one communication service 20 which are pro-actively provided from the base station 201 without previously sending an explicit resource request message to the base station 201.

The transceiver 10 may be configured to at least once or periodically transmit the information about its current location in reaction to a predetermined condition being fulfilled, wherein said predetermined condition comprises at least one of:

a spatial distance to a previous position at which the transceiver 10 previously transmitted information about its current location to a base station 201, a change in a mobility state of the transceiver 10, a change in a direction of movement of the transceiver 10, a change between an indoor state and an outdoor state, or a combination of one or more of the above combined with a timer function.

For example, a change in a direction of movement of the transceiver 10 may be detected by means of a motion vector. For example, an acceleration and/or deceleration of the transceiver 10 may be determined. For example, if the transceiver 10 slows down (decelerates), the transceiver 10 may be configured to refrain from receiving and/or transmitting communication data 14, 15 being related to the at least one communication service 20.

The corresponding inventive base station 201 may proactively provide to the transceiver 10 a resource configuration and/or one or more dedicated resources being related to the at least one communication service 20. Accordingly, an inventive base station 201 may be configured to periodically receive information about the current location of the at least one transceiver. If the information about its current location indicates towards the base station 201 that the at least one transceiver 10 is inside the geographical area 500 being related to the at least one communication service 20, then the base station 201 may be configured to pro-actively provide a resource configuration for the at least one communication service 20 to the at least one transceiver 10 without previously receiving an explicit resource configuration request message from the at least one transceiver 10.

Additionally or alternatively, if the at least one transceiver 10 previously received a resource configuration for the at least one communication service from the said base station 201, then the base station 201 may be configured to pro-actively provide one or more resources for the at least one communication service 20 to the at least one transceiver 10 without previously receiving an explicit resource request message from the at least one transceiver 10.

Idea 3: RSU Proactively Relays Resources for Transmission Once P-UE Enters Vehicular Proximity Similar to the previous concept, it is proposed that a Relay Unit, e.g. a RSU (Road Side Unit) or other relay UEs, may be capable of providing a resource configuration and/or one or more resources to the transceiver 10 for transmission of its location to other UEs 21, e.g. to V-UEs.

This is similar to Idea 1 above, with the exception that Relay Units may be located in the designated geographical areas 500. For instance, RSUs may be located in areas of vehicular proximity and hence do not require any additional information apart from a request from the transceiver 10 for a resource configuration and/or one or more resources. The Relay Unit would have already been configured to relay the resource configuration and/or the one or more resources by the gNB 201. For instance, a RSU would have already been configured to relay resources for P-UEs by the gNB 201.

According to such an embodiment, the transceiver 10 may be configured to send a resource configuration request message to a base station 201 for requesting a resource configuration being related to the at least one communication service 20, when the transceiver 10 is located inside the designated geographical area 500 being related to the at least one communication service 20. According to this example, the transceiver 10 may be configured to send said resource configuration request message to the base station 201 via a Relay Unit (e.g. a RSU) relaying said resource configuration request message to the base station 201.

Additionally or alternatively, the transceiver 10 may be configured to receive the requested resource configuration related to the at least one communication service 20 from the base station 201 via a Relay Unit (e.g. a RSU) which relays said resource configuration from the base station 201 to the transceiver 10, when the transceiver 10 is located inside the designated geographical area 500 being related to the at least one communication service 20.

There may be two scenarios. In a first one the transceiver needs the resource configuration first, e.g. via the Relay Unit, which is described above. In a second scenario, the transceiver 10 already received the resource configuration, but now needs to request for one or more dedicated resources, which will be described below.

If the transceiver 10 may have previously received a resource configuration, the transceiver 10 may then request one or more dedicated resources for the at least one communication service 20.

According to such an example, the transceiver 10 may be configured to send a resource request message to a base station 201 for requesting one or more resources for the at least one communication service 20 from said base station 201, when the transceiver 10 is located inside the designated geographical area 500 being related to the at least one communication service 20, and when the transceiver 10 previously received a resource configuration related to the at least one communication service 20. According to this example, the transceiver 10 may be configured to send said resource request message to the base station 201 via a Relay Unit which relays said resource request message to the base station 201.

Additionally or alternatively, the transceiver 10 may be configured to receive the requested one or more resources for the at least one communication service 20 from the base station 201 via a Relay Unit relaying said one or more resources for the at least one communication service 20 from the base station 201 to the transceiver (10), when the transceiver 10 is located inside the designated geographical area 500 being related to the at least one communication service 20, and when the transceiver 10 previously received a resource configuration related to the at least one communication service 20.

The Relay Unit may be arranged inside the designated geographical area 500 being related to the at least one communication service 20. The Relay Unit may be comprised by at least one of:

a Road Side Unit, a vehicular User Equipment or a plane, helicopter, flying unmanned aerial vehicle (e.g. drone), satellite (NTN), a further transceiver 21 related to the at least one communication service 20, a further transceiver 21 related to the second service 22.

The corresponding inventive base station 201 may provide a resource configuration and/or one or more dedicated resources for the at least one communication service 20 to the transceiver 10 in a manner relayed by a Relay Unit.

For providing a resource configuration via a Relay Unit, an inventive base station 201 may be configured to receive a resource configuration request message from the at least one transceiver 10 for requesting a resource configuration, when the at least one transceiver 10 is located inside the geographical area 500 being related to the at least one communication service 20. The base station 201 may receive said resource configuration request message from the at least one transceiver 10 via a Relay Unit which relays said resource configuration request message to the base station 201.

In response, the base station 201 may be configured to transmit the requested resource configuration to the at least one transceiver 10 via the or another Relay Unit, when the at least one transceiver 10 is located inside the geographical area 500 being related to the at least one communication service 20.

For providing one or more dedicated resources via a Relay Unit, an inventive base station 201 may be configured to receive a resource request message from the at least one transceiver 10 for requesting one or more resources for the at least one communication service 20, when the at least one transceiver 10 is located inside the geographical area 500 being related to the at least one communication service 20. The base station 201 may be configured to receive said resource request message from the at least one transceiver 10 via a Relay Unit which relays said resource request message to the base station 201.

In response the base station 201 may be configured to transmit the requested one or more resources for the at least one communication service 20 to the at least one transceiver 10 via the or another Relay Unit, when the at least one transceiver 10 is located inside the geographical area 500 being related to the at least one communication service 20.

Idea 4: Resources Provided Via New DCI/SCI Format

As described above, the gNB 201 may provide time-frequency resources for the broadcasting of the transceiver's 10 location using a new DCI format.

As described above, the Relay Unit (e.g. a RSU or a dedicated relay UE) may provide time-frequency resources for the transceiver 10 (e.g. a P-UE) using a new SCI format.

In order to facilitate the above ideas, the gNB 201 may exploit a new DCI format to pro-actively provide resources to the transceiver 10 (e.g. P-UE). The same may be provided by the Relay Unit (e.g. RSU) as well, but in the form of an SCI format.

The contents of the DCI/SCI may be as follows:

Time-frequency location of transmissions

Periodicity and duration of transmissions

One focus of this idea may be to define a new DCI and a new SCI meant for the purpose of catering to pedestrian UEs 10 with the capability of doing so. The P-UEs 10 may be essentially normal UEs (handsets), and the current set of Das sent/received by a base station 201 to these UEs 10 does not include information regarding SL communication. Similarly, SCIs may currently be sent/received only by V-UEs, and not by normal UEs 10.

According to an example, the transceiver 10 may be configured to read all the entailed SIBs as a normal UE, as well as read the SIB pertaining to sidelink. This may enable the transceiver 10 to obtain configuration information regarding the RPs and in turn, enable it to send/receive Das regarding sidelink communications. It can choose to read this SL SIB only when intimated that it is in the designated geographical area 500.

Thus, according to an embodiment, the transceiver 10 may be configured to receive from a base station 201 system information (SIB) being related to the at least one communication service 20. The system information being related to the at least one communication service 20 enables the transceiver 10 to receive a resource configuration and/or one or more resources being related to the at least one communication service 20 and to receive and/or transmit control information (DCI re. SL communication) being related to the at least one communication service 20.

According to a further embodiment, the transceiver 10 may be configured to read the system information (SIB) being related to the at least one communication service 20 only if the transceiver 10 is located inside the designated geographical area 500 being related to the at least one communication service 20.

The corresponding inventive base station 201 may be configured to transmit to the at least one transceiver 10 a system information (SIB) being related to the at least one communication service 20 and optionally a system information (SIB) being related to the second service 22, wherein the system information being related to the at least one communication service 20 enables the transceiver 10 to receive a resource configuration and/or one or more resources for the at least one communication service 20 and to receive and/or transmit control information (DCI re. SL communication) being related to the at least one communication service 20.

Idea 5—Resources Provided Via RRC Signalling

The resources for the beacon transmission may be provided using Configured Grants (CG) within the V2X pool. However, the transceiver 10 may not necessarily be aware of the existence of the V2X pool. It may look as a usual UL spectrum/slot/pool for the transceiver 10, where it is told to transmit its beacon by the gNB 201. However, the beacon transmission itself would be different from a usual PUSCH transmission in following sense:

Different transmission structure (PSCCH+PUSCH)

Different DMRS configuration

Different SCS

No piggybacking of UCI

Other UEs 21, e.g. V2X UEs, would instead be aware of the existence of the pool and could decode the beacon message making them aware of the transceiver 10.

A further embodiment is that the periodic resource may be provided within the resource configuration, e.g. within a P-UE configuration, such that the periodic resources may be tied to the beacon transmission and no other transmissions may be allowed. Furthermore, the different configuration parameters might also be conveyed within the said configuration.

Another option may be to configure a normal CG but to associate the CG configuration with the beacon transmission/P-UE behaviour. This may be done by providing the CG configuration ID within the resource configuration, e.g. within a P-UE configuration, (optionally together with the associated transmission parameters) and may result in the behaviour described in the previous paragraph.

Thus, according to an embodiment, the transceiver 10 may be configured to receive a configuration message, for example a Radio Resource Control—RRC—message, from a base station 201, when the transceiver 10 is inside the designated geographical area 500 being related to the at least one communication service 20. Additionally or alternatively, the transceiver 10 may be configured to receive the configuration message before the transceiver 10 enters the designated geographical area 500 being related to the at least one communication service 20. In either case, the transceiver 10 may be configured to configure its communication interface for a communication related to the at least one communication service 20 in response to said configuration message.

The corresponding inventive base station 201 may be configured to transmit a configuration message, for example a Radio Resource Control—RRC—message, to the at least one transceiver 10, when the at least one transceiver 10 is inside the geographical area 500 being related to the at least one communication service 20. The configuration message may comprise a resource configuration and/or one or more resources for the at least one communication service (20).

According to an example, said configuration message may comprise one or more periodic resources, for example one or more periodically repeating configured grants—CG wherein the transceiver 10 may be configured to use the one or more periodic resources for periodically transmitting communication data 14, 15 being related to the at least one communication service 20, for example one or more beacons.

It may be possible that the one or more periodic resources are exclusively reserved for the periodic transmission of the communication data 14, 15 being related to the at least one communication service 20, i.e. the periodic resource may be tied to the beacon transmission and no other transmission may be allowed.

At least one of the one or more periodic resources contained in said configuration message may comprise an identifier, for example a CG configuration ID, identifying said particular periodic resource as being a resource for a periodic transmission of the communication data 14, 15 being related to the at least one communication service 20, for example for a transmission of a beacon. That is, a CG configuration ID may be used for associating the CG configuration with the beacon transmission According to this example, the transceiver 10 may be configured to recognize, based on the identifier, said particular periodic resource and to use said particular periodic resource for a periodic transmission of the communication data 14, 15 being related to the at least one communication service 20.

Idea 6—Sensing Triggered P-UE Transmission

A transceiver 10 may periodically sense a frequency spectrum being related to the at least one communication service 20 and may start transmitting when other communication data 23 being related to the at least one communication service 20 has been detected. For example, a P-UE 10 may periodically sense the V2X spectrum and may start transmitting when other V2X transmissions are detected. In case of Mode 2 (M2), there may be no assistance from the network 100. To determine if the transceiver 10 (e.g. P-UE) should transmit, it may periodically sense a dedicated frequency spectrum being related to the at least one communication service 20 (e.g. a V2X spectrum). When it detects other transmissions (e.g. vehicular V2X transmissions), it may start transmitting itself or it may send a beacon to the other UEs 21 within a certain communication range or to a GL-UE if available, to convey that it will participate in all communications related to the at least one communication service 20, e.g. all communications relevant for P-UEs. The periodicity of sensing can vary and depend on the known proximity of the geographical area 500 (e.g. roads, street canyons, street types—highway/freeway/city limits, etc.) or the estimated or measured movement or mobility of the said transceiver 10.

According to such an embodiment, the transceiver 10 may be configured to periodically sense a predetermined frequency spectrum for the presence of at least one dedicated message comprising a data type being related to the at least one communication service 20. If the transceiver 10 may identify at least one such dedicated message in said predetermined frequency spectrum, the transceiver 10 may be configured to transmit the communication data 14,15 being related to the at least one communication service 20.

According to a further embodiment, the transceiver 10 may be configured to adapt a periodicity of periodically sensing the predetermined frequency spectrum based on a proximity to the designated geographical area 500 being related to the at least one communication service 20. For example, the periodicity may increase with increasing proximity. Imagine a P-UE that comes closer and closer to a geographical area 500 being related to a V2X service, e.g. an intersection 503 (FIG. 5). The closer the P-UE 10 may get to said intersection 503, the more frequently it may sense a predetermined V2X frequency spectrum for the presence of dedicated V2X messages.

Additionally or alternatively, the transceiver 10 may be configured to adapt a periodicity of periodically sensing the predetermined frequency spectrum based on a mobility state and/or a battery state of the transceiver 10. For example, a P-UE 10 that moves around in a V2X related geographical area 500 may more frequently sense a predetermined V2X frequency spectrum for the presence of a dedicated V2X message, while a P-UE 10 that stands still (e.g. in front of a red traffic light) may less frequently sense a predetermined V2X frequency spectrum for the presence of a dedicated V2X message.

Idea 7: Reduced Sensing for P-UE in Mode2

Constant sensing and recourse reselection are energy intensive and should be minimized with the inventive transceivers 10, particularly if they are comprised by P-UEs. To preserve battery power, a P-UE 10 may refrain from using the normal V2X M2 sensing procedure.

Alternatives may be:

Random hopping sensing,

Sensing once, e.g. in a pre-configured or randomly chosen frequency band, and then sticking to the chosen frequency band and transmission pattern for a longer, pre-defined time period before switching back to the sensing procedure. This type of sensing can be (pre-)configured in a SPS-type style with providing a sensing duration and interval, as well as a resource selection duration and interval. Furthermore, a reconfiguration of the sensing and resource reselection pattern, duration and intervals shall be allowed using appropriate signalling, e.g. RRC signalling.

According to such an embodiment, the transceiver 10 may be configured to periodically sense the predetermined frequency spectrum in a random hopping mode hopping randomly between two or more frequency bands of said predetermined frequency spectrum.

Additionally or alternatively, the transceiver 10 may be configured to periodically sense for the presence of said at least one message being related to the at least one communication service 20 inside one particular selected frequency band of the predetermined frequency spectrum for a predetermined and/or adjustable sensing duration or sensing interval.

For example, the transceiver 10 may be configured to receive a control message, for example a Radio Resource Control—RRC—message, from a base station 201, the control message comprising information for the transceiver 10 to adjust at least one of:

a sensing duration, a sensing interval, a resource selection duration, a resource selection interval.

According to a non-limiting example, the transceiver 10 as described herein may be comprised by at least one of:

a dedicated Pedestrian User Equipment, an industrial mobile machine, an unmanned aerial vehicle (UAV) or aerial vehicle, a baby stroller, a bicycle, scooter, motorbike, a roadside furniture, e.g. a construction sign or sign marking on streets.

The invention further concerns a wireless communication network 100 comprising one or more base stations 201 and one or more User Equipments, wherein at least one of the one or more base stations 201 comprises a transceiver 10 as described herein and/or wherein at least one of the one or more User Equipments comprises a transceiver 10 as described herein.

Figure 7:
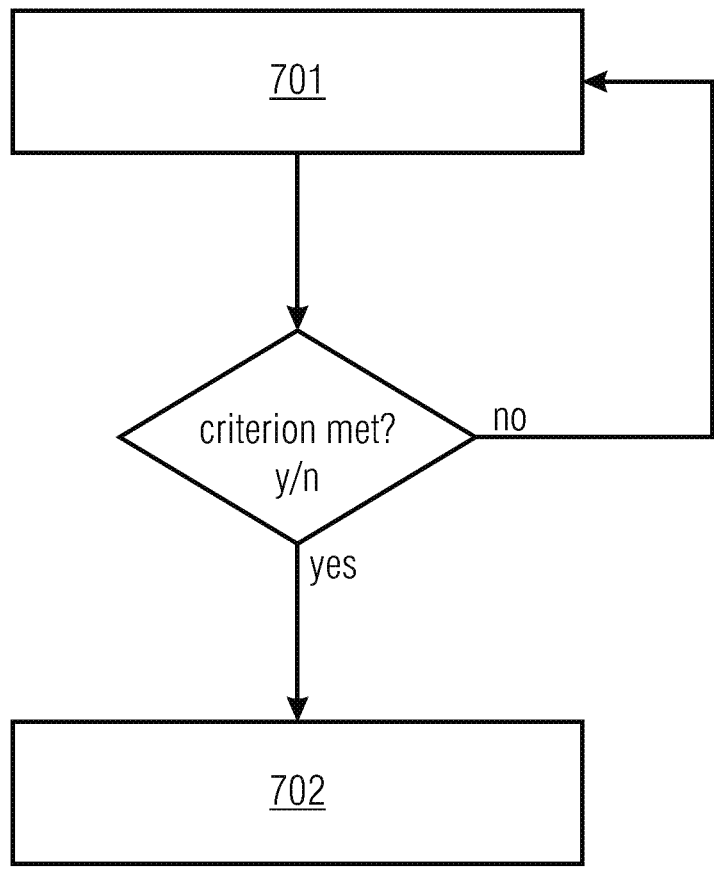
FIG. 7 is a schematic representation showing a method according to the invention.

The invention further concerns a method for operating a transceiver 10 for participating in at least one communication service 20 provided by a wireless communication network 100. FIG. 7 shows a schematic block diagram of said inventive method.

Block 701 represents a state in which the transceiver 10 may be set by default. This state may also be referred to as an idle state. In this state, the transceiver's capability of receiving and/or transmitting communication data 14, 15 pertaining to the at least one communication service 20 may be disabled.

Block 702 represents a state in which the transceiver 10 may be conditionally set, e.g. if one or more conditions are fulfilled. This state may also be referred to as a conditional state. In this state, the transceiver's capability of receiving and/or transmitting communication data 14, 15 pertaining to the at least one communication service 20 may be, at least temporarily, enabled.

The transceiver 10 may be set into said conditional state 702 only if at least one of the following predetermined criteria is met:

a. a current location of the transceiver 10 is determined to be inside a designated geographical area 500 being related to the at least one communication service 20, and/or b. an intimation signal (16) from a second service 22 being different to the at least one communication service 20 is received, and/or c. communication data 23 pertaining to the at least one communication service 20 is received.

The invention further concerns a non-transitory computer program product comprising a computer readable medium for storing instructions which, when executed on a computer, perform the method as described herein.

In the following, additional embodiments and aspects of the invention will be described which can be used individually or in combination with any of the features and functionalities and details described herein.

A first aspect relates to a transceiver 10 being configured to participate in at least one communication service 20 provided by a wireless communication network 100, wherein the transceiver 10 may comprise a communication interface 13 for receiving and/or transmitting communication data 14, 15 pertaining to the at least one communication service 20, wherein the transceiver 10 is configured to transmit and/or receive the communication data 14, 15 pertaining to the at least one communication service 20 if at least one of the following predetermined criteria is met:

a. a current location of the transceiver 10 is determined to be inside a designated geographical area 500 being related to the at least one communication service 20, and/or b. the transceiver 10 receives an intimation 16 signal from a second service 22 being different to the at least one communication service 20, and/or c. the transceiver 10 receives communication data 23 pertaining to the at least one communication service 20.

According to a second aspect when referring back to the first aspect, in the transceiver 10 the received communication data 23 pertaining to the at least one communication service 20 may be received by at least one of within a time window and/or within a frequency range, e.g. within a bandwidth part (BWP) or resource pool (RP), and/or in more than one instance of transmissions, and/or within a pre-defined message type.

Definition of the Geographical Area

According to a third aspect when referring back to the first or second aspect, in the transceiver 10, the designated geographical area 500 being related to the at least one communication service 20 may be at least one of:

a spatial vicinity to at least one or more further transceivers 21 being related to the at least one communication service 20, a spatial area related to the at least one communication service 20, an infrastructure, for example a traffic infrastructure, being related to the at least one communication service 20, a spatial vicinity to a road 502, a spatial vicinity to an intersection 503, a spatial vicinity to a road construction site, a spatial vicinity to a roadside furniture, e.g. lamp post, guard rail, etc., a spatial vicinity to a vehicular User Equipment, a spatial vicinity to hazardous areas on industrial sites, e.g. vicinity to automated machines on a factory floor, etc., a position within a communication range of at least one further transceiver 21 being related to the at least one communication service 20, a position within a configured minimum used communication range of at least one further transceivers 21 being related to the at least one communication service 20, a spatial vicinity to an infrastructure device, for example a road-side unit—RSU—, a position within a communication range of an infrastructure device, for example a road-side unit—RSU—, According to a fourth aspect when referring back to any of the first to third aspects, the transceiver 10 may be configured to determine whether it is inside the designated geographical area 500 by sensing for a presence of communication data 23 being related to the at least one communication service 20.

According to a fifth aspect when referring back to any of the first to fourth aspects, the transceiver 10 may be configured to determine whether it is inside the designated geographical area 500 by determining its position.

According to a sixth aspect when referring back to the fifth aspect, the transceiver 10 may be configured to determine its position by using at least one or more of:

GNSS

Cellular localization

WiFi-based assisted positioning

Fingerprinting using a wireless radio technology a mechanism according to which the transceiver gets its position signaled from the network 100 or from another device, e.g. another UE, either as position data or as an indicator whether the transceiver 10 is inside the designated geographical area 500 or not.

According to a seventh aspect when referring back to the fifth or sixth aspect, the transceiver 10 may be configured to determine whether it is inside the designated geographical area 500 by at least one of the following methods:

a direct or an indirect indication from the network 100, a direct or an indirect indication from an external application which resides within the transceiver 10, e.g. a pre-stored application, or which does not reside within the transceiver 10, e.g. an Internet application.

According to an eighth aspect when referring back to any of the first to seventh aspects, the at least one communication service 20 may comprise a communication using a Device-to-Device (D2D) communication protocol, for example a Vehicle-to-Everything (V2X) communication protocol which includes Vehicle-to-Pedestrian communication, involving communication with Pedestrian UEs (P-UEs).

According to a ninth aspect when referring back to any of the first to eighth aspects, the transceiver 10 may comprise a sidelink communication interface, for example a PC5-interface, and wherein the at least one communication service 20 comprises a communication between the transceiver 10 and at least one or more further transceivers 21 being related to the at least one communication service 20 via its sidelink communication interface.

According to a tenth aspect when referring back to the ninth aspect, the transceiver 10 may be configured to receive a resource configuration comprising configuration information for configuring the sidelink communication interface.

According to an eleventh aspect when referring back to the ninth or tenth aspect, the one or more further transceivers 21 being related to the at least one communication service 20 may comprise at least one vehicular User Equipment.

According to a twelfth aspect when referring back to any of the first to eleventh aspects, the second service 22 may comprise a communication with one or more base stations 201, and/or with one or more further transceivers being related to the second service 22, e.g. via a further PC5-interface.

According to a thirteenth aspect when referring back to the twelfth aspect, the one or more transceivers being related to the second service 22 may comprise at least one base station 201 or at least one User Equipment.

According to a fourteenth aspect when referring back to any of the first to thirteenth aspects, the intimation signal 16 from the second service 22 may be in the form of at least one of an explicit signal, e.g. explicit trigger or a broadcast signal via MIB/SIB or a groupcast signal, received by the transceiver 10, and/or a resource allocation information within configured resources received by the transceiver 10.

Idea 1:

Enabling/Disabling of P-UE Communication

According to a fifteenth aspect when referring back to any of the first to fourteenth aspects, the transceiver 10 may comprise a location determination unit configured to determine the current location of the transceiver 10 and to determine, based on said current location, whether the transceiver 10 is inside the designated geographical area 500 being related to the at least one communication service 20, and/or the transceiver 10 may comprise a mobility state determination unit configured to determine a current mobility state of the transceiver 10 and to determine, based on said current mobility state, whether the transceiver 10 is inside the designated geographical area 500 being related to the at least one communication service 20, and/or the transceiver 10 may be configured to sense for the presence of communication data 23 being related to the at least one communication service 20 and to determine whether the transceiver 10 is inside the designated geographical area 500 being related to the at least one communication service 20 if such communication data 23 was successfully detected.

According to a sixteenth aspect when referring back to any of the first to fifteenth aspects, the transceiver 10 may comprise a mobility state determination unit configured to determine a current mobility state of the transceiver 10 and to determine, based on said current mobility state, whether the transceiver is in a mobility state related to the at least one communication service 20.

According to a seventeenth aspect when referring back to any of the first to sixteenth aspects, the transceiver 10 may be configured to actively request a resource configuration and/or one or more resources for the at least one communication service 20 from a base station 201:

if the current location of the transceiver 10 is determined to be inside the designated geographical area 500 being related to the at least one communication service 20, and/or if the transceiver 10 successfully received communication data 23 being related to the at least one communication service 20.

According to an eighteenth aspect when referring back to the seventeenth aspect, the transceiver 10 may be configured to receive a configuration message from a base station 201 and/or from the network 100, the configuration message comprising the requested resource configuration and/or the one or more requested resources for the at least one communication service 20, wherein the transceiver 10 may be configured to receive the configuration message when the transceiver 10 is inside the designated geographical area 500, and to make use of the resource configuration and/or the one more resources for the at least one communication service 20, when the transceiver 10 is inside the designated geographical area 500, or wherein the transceiver 10 may be configured to receive the configuration message before the transceiver 10 enters the designated geographical area 500, and to refrain from using the resource configuration and/or the one or more resources for the at least one communication service 20 before the transceiver 10 is inside the designated geographical area 500.

According to a nineteenth aspect when referring back to the eighteenth aspect, the transceiver 10 may comprise a sensor for generating sensor data being related to a current mobility state of the transceiver 10, and the transceiver 10 may be configured to provide said sensor data to a base station 201 or to the network 100, and to receive the requested resource configuration for the at least one communication service 20 from the base station 201 and/or from the network 100, in case the base station 201 and/or the network 100 determines, based on the sensor data, that the transceiver 10 is inside the designated geographical area 500 being related to the at least one communication service 20, or the transceiver 10 may be configured to provide said sensor data to a base station 201 or to the network 100, and to receive the requested one or more resources for the at least one communication service 20 from the base station 201 and/or from the network 100, in case the base station 201 and/or the network 100 determines, based on the sensor data, that the transceiver 10 is inside the designated geographical area 500 being related to the at least one communication service 20, or in case the transceiver 10 successfully received communication data 23 being related to the at least one communication service 20.

According to a twentieth aspect when referring back to any of the first to nineteenth aspects, the transceiver 10 may be configured to determine whether it is located indoors or outdoors and/or whether it is part of a predetermined geographical area, and the transceiver 10 may be configured to transmit and/or receive communication data 14, 15 being related to the at least one communication service 20 only when the current location of the transceiver 10 is determined to be outdoors, or the transceiver 10 may be configured to only receive but not to transmit communication data 14, 15 being related to the at least one communication service 20 when the current location of the transceiver 10 is determined to be indoors.

According to a twenty-first aspect when referring back to the twentieth aspect, the transceiver 10 may be configured to determine whether it is located indoors or outdoors by receiving a notification from a base station 201 or from the network 100 indicating to the transceiver 10 whether it is connected to an indoor base station or to an outdoor base station.

According to a twenty-second aspect when referring back to the twentieth or twenty-first aspect, if the transceiver 10 has a path loss that is above a predetermined threshold, then the transceiver 10 may be configured to actively refrain from receiving and/or transmitting communication data 14, 15 being related to the at least one communication service 20, and/or if the transceiver 10 has a path loss that is below a predetermined threshold, then the transceiver 10 may be configured to transmit and/or receive communication data 14, 15 being related to the at least one communication service 20.

According to a twenty-third aspect when referring back to any of the twentieth to twenty-second aspects, if the transceiver 10 is in coverage of a separate campus network, the transceiver 10 may be configured not to receive and/or transmit communication data being related to the at least one communication service 20 when the current location of the transceiver 10 is determined to be indoors.

Idea 2:

gNB Pro-Actively Provides Resources

According to a twenty-fourth aspect when referring back to any of the first to twenty-third aspects, the transceiver 10 may be configured to periodically transmit information about its current location to a base station 201, and, if the information about its current location indicates towards the base station 201 that the transceiver 10 is inside the designated geographical area 500 being related to the at least one communication service 20, then the transceiver 10 may be configured to receive a resource configuration related to the at least one communication service 20 pro-actively from the base station 201 without previously sending an explicit resource configuration request message to the base station 201.

According to a twenty-fifth aspect when referring back to any of the first to twenty-fourth aspects, the transceiver 10 may be configured to periodically transmit information about its current location to a base station 201, and if the information about its current location indicates towards the base station 201 that the transceiver 10 is inside the designated geographical area 500 being related to the at least one communication service 20, and if the transceiver 10 previously received a resource configuration related to the at least one communication service 20, then the transceiver 10 may be configured to receive one or more resources for the at least one communication service 20 which are pro-actively provided from the base station 201 without previously sending an explicit resource request message to the base station 201.

According to a twenty-sixth aspect when referring back to the twenty-fourth or twenty-fifth aspect, the transceiver 10 may be configured to at least once or periodically transmit the information about its current location in reaction to a predetermined condition being fulfilled.

According to a twenty-seventh aspect when referring back to the twenty-sixth aspect, said predetermined condition may comprise at least one of:

a spatial distance to a previous position at which the transceiver 10 previously transmitted information about its current location to a base station 201, a change in a mobility state of the transceiver 10, a change in a direction of movement of the transceiver 10, a change between an indoor state and an outdoor state, or a combination of one or more of the above combined with a timer function.

Idea 3:

Resources Relayed by RSU

According to a twenty-eighth aspect when referring back to any of the first to twenty-seventh aspects, the transceiver 10 may be configured to send a resource configuration request message to a base station 201 for requesting a resource configuration being related to the at least one communication service 20, when the transceiver 10 is located inside the designated geographical area 500 being related to the at least one communication service 20, and wherein the transceiver 10 may be configured to send said resource configuration request message to the base station 201 via a Relay Unit relaying said resource configuration request message to the base station 201.

According to a twenty-ninth aspect when referring back to the twenty-eighth aspect, the transceiver 10 may be configured to receive the requested resource configuration related to the at least one communication service 20 from the base station 201 via a Relay Unit relaying said resource configuration from the base station 201 to the transceiver 10, when the transceiver 10 is located inside the designated geographical area 500 being related to the at least one communication service 20.

According to a thirtieth aspect when referring back to any of the first to twenty-ninth aspects, the transceiver 10 may be configured to send a resource request message to a base station 201 for requesting one or more resources for the at least one communication service 20 from said base station 201, when the transceiver 10 is located inside the designated geographical area 500 being related to the at least one communication service 20, and when the transceiver 10 previously received a resource configuration related to the at least one communication service 20, wherein the transceiver 10 may be configured to send said resource request message to the base station 201 via a Relay Unit relaying said resource request message to the base station 201.

According to a thirty-first aspect when referring back to the thirtieth aspect, the transceiver 10 may be configured to receive the requested one or more resources for the at least one communication service 20 from the base station 201 via a Relay Unit relaying said one or more resources for the at least one communication service 20 from the base station 201 to the transceiver 10, when the transceiver 10 is located inside the designated geographical area 500 being related to the at least one communication service 20, and when the transceiver 10 previously received a resource configuration related to the at least one communication service 20.

According to a thirty-second aspect when referring back to any of the twenty-eighth to thirty-first aspects, the Relay Unit may be arranged inside the designated geographical area 500 being related to the at least one communication service 20.

According to a thirty-third aspect when referring back to any of the twenty-eighth to thirty-second aspects, the Relay Unit may be comprised by at least one of a Road Side Unit, a vehicular User Equipment or a plane, helicopter, flying unmanned aerial vehicle (e.g. drone), satellite (NTN), a further transceiver 21 related to the at least one communication service 20, a further transceiver 21 related to the second service 22.

Idea 4:

New DCI/SCI Format

According to a thirty-fourth aspect when referring back to any of the first to thirty-third aspects, the transceiver 10 may be configured to receive from a base station 201 system information (SIB) being related to the at least one communication service 20, wherein the system information being related to the at least one communication service 20 may enable the transceiver 10 to receive a resource configuration and/or one or more resources being related to the at least one communication service 20 and to receive and/or transmit control information (DCI re. SL communication) being related to the at least one communication service 20.

According to a thirty-fifth aspect when referring back to the thirty-fourth aspect, the transceiver 10 may be configured to read the system information (SIB) being related to the at least one communication service 20 only if the transceiver 10 is located inside the designated geographical area 500 being related to the at least one communication service 20.

Idea 5:

Resources Provided Via RRC Signaling

According to a thirty-sixth aspect when referring back to any of the first to thirty-fifth aspects, the transceiver 10 may be configured to receive a configuration message, for example a Radio Resource Control—RRC—message, from a base station 201, when the transceiver 10 is inside the designated geographical area 500 being related to the at least one communication service 20, and/or to receive the configuration message before the transceiver 10 enters the designated geographical area 500 being related to the at least one communication service 20, and the transceiver 10 may be configured to configure its communication interface for a communication related to the at least one communication service 20 in response to said configuration message.

According to a thirty-seventh aspect when referring back to the thirty-sixth aspect, said configuration message may comprise one or more periodic resources, for example one or more periodically repeating configured grants—CG—, and the transceiver 10 may be configured to use the one or more periodic resources for periodically transmitting communication data 14, 15 being related to the at least one communication service 20, for example one or more beacons.

According to a thirty-eighth aspect when referring back to the thirty-seventh aspect, the one or more periodic resources may be exclusively reserved for the periodic transmission of the communication data 14, 15 being related to the at least one communication service 20.

According to a thirty-ninth aspect when referring back to the thirty-seventh or thirty-eighth aspect, at least one of the one or more periodic resources contained in said configuration message may comprise an identifier, for example a CG configuration ID, identifying said particular periodic resource as being a resource for a periodic transmission of the communication data 14, 15 being related to the at least one communication service 20, for example for a transmission of a beacon, and the transceiver 10 may be configured to recognize, based on the identifier, said particular periodic resource and to use said particular periodic resource for a periodic transmission of the communication data 14, 15 being related to the at least one communication service 20.

Idea 6:

Sensing-Triggered P-UE Transmission

According to a fortieth aspect when referring back to any of the first to thirty-ninth aspects, the transceiver 10 may be configured to periodically sense a predetermined frequency spectrum for the presence of at least one message comprising a data type being related to the at least one communication service 20, and if the transceiver 10 identifies at least one such message in said predetermined frequency spectrum, the transceiver 10 may be configured to transmit the communication data 14, 15 being related to the at least one communication service 20.

According to a forty-first aspect when referring back to the fortieth aspect, the transceiver 10 may be configured to adapt a periodicity of periodically sensing the predetermined frequency spectrum based on a proximity to the designated geographical area 500 being related to the at least one communication service 20, wherein the periodicity may increase with increasing proximity.

According to a forty-second aspect when referring back to the fortieth or forty-first aspect, the transceiver 10 may be configured to adapt a periodicity of periodically sensing the predetermined frequency spectrum based on a mobility state and/or battery state of the transceiver 10.

Idea 7:

Reduced Sensing for P-UE in Mode2

According to a forty-third aspect when referring back to any of the fortieth to forty-second aspects, the transceiver 10 may be configured to periodically sense the predetermined frequency spectrum in a random hopping mode hopping randomly between two or more frequency bands of said predetermined frequency spectrum.

According to a forty-fourth aspect when referring back to any of the fortieth to forty-third aspects, the transceiver 10 may be configured to periodically sense for the presence of said at least one message being related to the at least one communication service 20 inside one selected frequency band of the predetermined frequency spectrum for a predetermined and/or adjustable sensing duration or sensing interval.

According to a forty-fifth aspect when referring back to the forty-fourth aspect, the transceiver 10 may be configured to receive a control message, for example a Radio Resource Control—RRC—message, from a base station 201, the control message comprising information for the transceiver 10 to adjust at least one of:

a sensing duration, a sensing interval, a resource selection duration, a resource selection interval.

According to a forty-sixth aspect when referring back to any of the first to forty-fifth aspects, the transceiver 10 may be comprised by at least one of:

a dedicated Pedestrian User Equipment, an industrial mobile machine, an unmanned aerial vehicle (UAV) or aerial vehicle, a baby stroller, a bicycle, scooter, motorbike, roadside furniture, e.g. construction sign or sign marking on streets.

Aspects for Base Station

A forty-seventh aspect relates to base station 201 for a wireless communication network, the base station 201 being configured to provide to at least one transceiver 10 a resource configuration being related to at least one communication service 20 and/or one or more resources being related to the at least one communication service 20, wherein said resource configuration comprises configuration information for the at least one transceiver 10 for configuring a communication interface of the at least one transceiver 10 so as to participate in a communication with one or more further transceivers 21 related to the at least one communication service 20, and wherein said one or more resources are usable by the at least one transceiver 10 for participating in said communication with the one or more further transceivers 21, wherein the base station 201 is configured to provide said resource configuration to the at least one transceiver 10 if a current location of the at least one transceiver 10 is determined to be inside or outside a designated geographical area 500 being related to the at least one communication service 20, and provide said one or more resources to the at least one transceiver 10 if a current location of the at least one transceiver 10 is determined to be inside or in spatial vicinity of the designated geographical area 500 being related to the at least one communication service 20.

According to a forty-eighth aspect when referring back to the forty-seventh aspect, the base station 201 may be configured to receive a resource configuration request message from said at least one transceiver 10 when the current location of said at least one transceiver 10 is determined to be inside the geographical area 500 being related to the at least one communication service 20, and the base station 201 may be configured to provide a resource configuration for the at least one communication service 20 to said at least one transceiver 10 in response to the received resource configuration request message.

According to a forty-ninth aspect when referring back to the forty-eighth aspect, the base station 201 may be configured to transmit a resource configuration response message to the at least one transceiver 10 when the at least one transceiver 10 is inside the designated geographical area 500, the resource configuration response message comprising the requested resource configuration, and/or the base station 201 may be configured to provide to the at least one transceiver 10 the requested resource configuration for the at least one communication service 20 when the location of the at least one transceiver 10 is determined to be outside the designated geographical area 500, and to allocate to the at least one transceiver 10 one or more dedicated resources from the resource configuration upon receipt of the resource configuration request message when the at least one transceiver 10 is inside the designated geographical area 500.

According to a fiftieth aspect when referring back to the forty-seventh aspect, the base station 201 may be configured to receive a resource request message from said at least one transceiver 10 when the current location of said at least one transceiver 10 is determined to be inside the geographical area 500 being related to the at least one communication service 20, the resource request message comprising a request for one or more resources being related to the at least one communication service 20.

According to a fifty-first aspect when referring back to the fiftieth aspect, the base station 201 may be configured to transmit a resource response message to the at least one transceiver 10 when the at least one transceiver 10 is inside the designated geographical area 500, the resource response message comprising the requested one or more resources for the at least one communication service 20.

According to a fifty-second aspect when referring back to any of the forty-seventh to fifty-first aspects, the base station 201 may be configured to keep track of the current location of the at least one transceiver 10 in order to determine when the at least one transceiver 10 is inside the geographical area 500 being related to the at least one communication service.

According to a fifty-third aspect when referring back to any of the forty-seventh to fifty-second aspects, the base station 201 may be configured to receive sensor data from the at least one transceiver 10, the sensor data being related to a current mobility state of the at least one transceiver 10, and the base station 201 may be configured to determine, based on the sensor data, when the at least one transceiver 10 is inside the geographical area 500 being related to the at least one communication service 20.

According to a fifty-fourth aspect when referring back to any of the forty-seventh to fifty-third aspects, the base station 201 may be configured to transmit a notification to the at least one transceiver 10, the notification indicating towards the at least one transceiver 10 whether it is connected to an indoor base station 201 or to an outdoor base station 201 so as to determine whether the at least one transceiver 10 is located indoors or outdoors.

According to a fifty-fifth aspect when referring back to the fifty-fourth aspect, if the current location of the at least one transceiver 10 is determined to be outdoors, the base station 201 may be configured to transmit a resource configuration and/or one or more resources for the at least one communication service 20 to the at least one transceiver 10 enabling the transceiver 10 to transmit and/or receive communication data 14, 15 being related to the at least one communication service 20, and/or if the current location of the at least one transceiver 10 is determined to be indoors, the base station 201 may be configured to transmit said resource configuration and/or said one or more resources to the at least one transceiver 10 enabling the at least one transceiver 10 to only receive but not to transmit communication data 14, 15 being related to the at least one communication service 20.

According to a fifty-sixth aspect when referring back to any of the forty-seventh to fifty-fifth aspects, if the base station 201 determines that the at least one transceiver 10 has a path loss that is above a predetermined threshold, then the base station 201 may be configured to transmit a resource configuration and/or one or more resources for the at least one communication service 20 to the at least one transceiver 10 enabling the at least one transceiver 10 to actively refrain from receiving and/or transmitting communication data 14, 15 being related to the at least one communication service 20, and/or if the base station 201 determines that the at least one transceiver 10 has a path loss that is below a predetermined threshold, then the base station 201 may be configured to transmit said resource configuration and/or said one or more resources to the at least one transceiver 10 enabling the at least one transceiver 10 to transmit and/or receive communication data 14, 15 being related to the at least one communication service 20.

Idea 2:

gNB Pro-Actively Provides Resources

According to a fifty-seventh aspect when referring back to any of the forty-seventh to fifty-sixth aspects, the base station 201 may be configured to periodically receive information about the current location of the at least one transceiver 10, and if the information about its current location indicates towards the base station 201 that the at least one transceiver 10 is inside the geographical area 500 being related to the at least one communication service 20, then the base station 201 may be configured to proactively provide a resource configuration for the at least one communication service 20 to the at least one transceiver 10 without previously receiving an explicit resource configuration request message from the at least one transceiver 10.

According to a fifty-eighth aspect when referring back to any of the forty-seventh to fifty-seventh aspects, the base station 201 may be configured to periodically receive information about the current location of the at least one transceiver 10, and if the information about its current location indicates towards the base station 201 that the at least one transceiver 10 is inside the designated geographical area 500 being related to the at least one communication service 20, and if the at least one transceiver 10 previously received a resource configuration for the at least one communication service from the said base station 201, then the base station 201 may be configured to proactively provide one or more resources for the at least one communication service 20 to the at least one transceiver 10 without previously receiving an explicit resource request message from the at least one transceiver 10.

Idea 3:

Resources Relayed by RSU

According to a fifty-ninth aspect when referring back to any of the forty-seventh to fifty-eighth aspects, the base station 201 may be configured to receive a resource configuration request message from the at least one transceiver 10 for requesting a resource configuration, when the at least one transceiver 10 is located inside the geographical area 500 being related to the at least one communication service 20, and the base station 201 may be configured to receive said resource configuration request message from the at least one transceiver 10 via a Relay Unit relaying said resource configuration request message to the base station 201.

According to a sixtieth aspect when referring back to the fifty-ninth aspect, the base station 201 may be configured to transmit the requested resource configuration to the at least one transceiver 10 via the or another Relay Unit, when the at least one transceiver 10 is located inside the geographical area 500 being related to the at least one communication service 20.

According to a sixty-first aspect when referring back to any of the forty-seventh to sixtieth aspects, the base station 201 may be configured to receive a resource request message from the at least one transceiver 10 for requesting one or more resources for the at least one communication service 20, when the at least one transceiver 10 is located inside the geographical area 500 being related to the at least one communication service 20, and the base station 201 may be configured to receive said resource request message from the at least one transceiver 10 via a Relay Unit relaying said resource request message to the base station 201.

According to a sixty-second aspect when referring back to the sixty-first aspect, the base station 201 may be configured to transmit the requested one or more resources for the at least one communication service 20 to the at least one transceiver 10 via the or another Relay Unit, when the at least one transceiver 10 is located inside the geographical area 500 being related to the at least one communication service 20.

Idea 4:

New DCI/SCI Format

According to a sixty-third aspect when referring back to any of the forty-seventh to sixty-second aspects, the base station 201 may be configured to transmit to the at least one transceiver 10 system information (SIB) being related to the at least one communication service 20, wherein the system information being related to the at least one communication service 20 may enable the at least one transceiver 10 to receive a resource configuration and/or one or more resources for the at least one communication service 20, and to receive and/or transmit control information (DCI re. SL communication) being related to the at least one communication service 20.

Idea 5:

Resources Provided Via RRC Signaling

According to a sixty-fourth aspect when referring back to any of the forty-seventh to sixty-third aspects, the base station 201 may be configured to transmit a configuration message, for example a Radio Resource Control—RRC—message, to the at least one transceiver 10, when the at least one transceiver 10 is inside the geographical area 500 being related to the at least one communication service 20, and the configuration message may comprise a resource configuration and/or one or more resources for the at least one communication service 20.

According to a sixty-fifth aspect when referring back to the sixty-third aspect, said configuration message may comprise one or more periodic resources, for example one or more periodically repeating configured grants—CG—, to be used by the at least one transceiver 10 for periodically transmitting the communication data 14, 15 being related to the at least one communication service 20, for example one or more beacons.

According to a sixty-sixth aspect when referring back to the sixty-fifth aspect, the one or more periodic resources may be exclusively reserved for the periodic transmission of the communication data 14, 15 being related to the at least one communication service 20.

According to a sixty-seventh aspect when referring back to the sixty-fifth or sixty-sixth aspect, at least one of the one or more periodic resources contained in said configuration message may comprise an identifier, for example a CG configuration ID, identifying said particular periodic resource as being a resource for a periodic transmission of the communication data 14, 15 being related to the at least one communication service 20, for example for a transmission of a beacon.

According to a sixty-eighth aspect when referring back to any of the forty-seventh to sixty-seventh aspects, the base station 201 may be configured to provide the resource configuration and/or the one or more resources for the at least one communication service 20 by means of a second service 22 being different from that at least one communication service 20.

Aspect for Wireless Network

According to a sixty-ninth aspect, a wireless communication network 100 may comprise:

one or more base stations 201 and one or more User Equipments, wherein at least one of the one or more base stations 201 comprises a transceiver 10 according to any of the forty-seventh to sixty-eighth aspects and/or wherein at least one of the one or more User Equipments comprises a transceiver 10 according to any one of the first to forty-sixth aspects.

Method Aspect

A seventieth aspect relates to a method for operating a transceiver 10 for participating in at least one communication service 20 provided by a wireless communication network 100, wherein the method may have:

receiving and/or transmitting communication data 14, 15 pertaining to the at least one communication service 20, wherein the step of transmitting and/or receiving said communication data 14, 15 pertaining to the at least one communication service 20 is enabled only if at least one of the following predetermined criteria is met:

a. a current location of the transceiver 10 is determined to be inside a designated geographical area 500 being related to the at least one communication service 20, and/or b. an intimation signal 16 from a second service 22 being different to the at least one communication service 20 is received, and/or c. communication data 14, 15 pertaining to the at least one communication service 20 is received.

According to a seventy-first aspect, a non-transitory computer program product may comprise a computer readable medium for storing instructions which, when executed on a computer, perform the method of the seventieth aspect.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

| LIST OF ACRONYMS AND SYMBOLS | |
|---|---|
| V2X | Vehicle-to-Everything |
| 3GPP | Third Generation Partnership Project |
| D2D | Device-to-Device |
| ITS | Intelligent Transport Services |
| FR1, FR2 | Frequency Range Designations |
| BS | Base Station |
| eNB | Evolved Node B (3G base station) |
| UE | User Equipment |
| SL | Sidelink |
| V2V | Vehicle-to-Vehicle |
| SCS | Sub Carrier Spacing |
| RB | Resource Block |
| PSCCH | Physical Sidelink Control Channel |
| PSSCH | Physical Sidelink Shared Channel |
| TTI | Transmit Time Interval |
| SCI | Sidelink Control Information |
| DCI | Downlink Control Information |
| CP | Cyclic Prefix |
| BWP | Bandwidth Part |
| CORESET | Control Resource Set |
| USS | UE-Specific Search Space |

-continued

| LIST OF ACRONYMS AND SYMBOLS | |
|---|---|
| CSS | Common Search Space |
| RP | Resource Pool |
| M1 | Mode 1 |
| M2 | Mode 2 |
| M3 | Mode 3 (LTE V2X) |
| M4 | Mode 4 (LTE V2X) |

The invention claimed is:

1. A transceiver being configured to participate in a V2X-sidelink communication service provided by a wireless communication network, the transceiver comprising a PC5 sidelink communication interface for receiving and transmitting V2X-sidelink communication data, wherein the transceiver is configured to conditionally transmit or receive the V2X-sidelink communication data if the following predetermined condition is met:

the transceiver receives an intimation signal from another transceiver using a second service being different to the V2X-sidelink communication service, wherein the transceiver is a first user equipment and wherein the another transceiver is a different second user equipment, and wherein the intimation signal from the second service is at least one of an explicit signal in form of an explicit trigger or a broadcast signal via MIB/SIB or a groupcast signal, received by the transceiver, or a resource allocation information within configured resources received by the transceiver, wherein the intimation signal is received while both transceivers are out-of-coverage of the wireless communication network and operate in NR-Mode 2 in which the two transceivers are directly communicating with each other without assistance from the base station or the wireless communication network.

2. The transceiver of claim 1, wherein the received V2X-sidelink communication data is received at least one of within a time window and/or within a frequency range, e.g. within a bandwidth part or resource pool, and/or in more than one instance of transmissions, and/or within a pre-defined message type.

3. The transceiver of claim 1, wherein the V2X-sidelink communication service comprises a communication between the transceiver and at least one or more further transceivers being related to the V2X-sidelink communication service via the PC5 sidelink communication interface.

4. The transceiver of claim 3, wherein the transceiver is configured to receive a resource configuration comprising configuration information for configuring the PC5 sidelink communication interface.

5. The transceiver of claim 1, wherein the transceiver is configured to sense for a presence of V2X-sidelink communication data and to determine whether the transceiver is inside a designated geographical area being related to the V2X-sidelink communication service if the V2X-sidelink communication data was successfully detected.

6. The transceiver of claim 1, wherein the transceiver is configured to actively request a resource configuration or one or more resources for the V2X-sidelink communication service from a base station:

if a current location of the transceiver is determined to be inside a designated geographical area being related to the V2X-sidelink communication service, or if the transceiver successfully received the V2X-sidelink communication data.

7. The transceiver of claim 6, wherein the transceiver is configured to receive a configuration message from a base station or from the wireless communication network, the configuration message comprising the requested resource configuration or the one or more requested resources for the V2X-sidelink communication service, wherein the transceiver is configured to receive the configuration message when the transceiver is inside a designated geographical area, and to make use of the resource configuration or the one more resources for the V2X-sidelink communication service, when the transceiver is inside the designated geographical area, or wherein the transceiver is configured to receive the configuration message before the transceiver enters a designated geographical area, and to refrain from using the resource configuration or the one or more resources for the V2X-sidelink communication service before the transceiver is inside the designated geographical area.

8. The transceiver of claim 1, wherein the transceiver is configured to send a resource configuration request message to a base station for requesting a resource configuration being related to the V2X-sidelink communication service, when the transceiver is located inside a designated geographical area being related to the V2X-sidelink communication service, and wherein the transceiver is configured to send said resource configuration request message to the base station via a Relay Unit relaying said resource configuration request message to the base station.

9. The transceiver of claim 1, wherein the transceiver is configured to send a resource request message to a base station for requesting one or more resources for the V2X-sidelink communication service from said base station, when the transceiver is located inside a designated geographical area being related to the V2X-sidelink communication service, and when the transceiver previously received a resource configuration related to the V2X-sidelink communication service, wherein the transceiver is configured to send said resource request message to the base station via a Relay Unit relaying said resource request message to the base station.

10. The transceiver of claim 1, wherein the transceiver is configured to receive a configuration message in form of a Radio Resource Control—RRC—message from a base station, when the transceiver is inside a designated geographical area being related to the V2X-sidelink communication service, or to receive the configuration message before the transceiver enters the designated geographical area being related to the V2X-sidelink communication service, and wherein the transceiver is configured to configure the PC5 sidelink communication interface for a communication related to the V2X-sidelink communication service in response to said configuration message.

11. The transceiver of claim 10, wherein said configuration message comprises one or more periodic resources in form of one or more periodically repeating configured grants-CG-, and wherein the transceiver is configured to use the one or more periodic resources for periodically transmitting the V2X-sidelink communication data in form of one or more beacons.

12. The transceiver of claim 11, wherein the one or more periodic resources are exclusively reserved for the periodic transmission of the V2X-sidelink communication data.

13. The transceiver of claim 11, wherein at least one of the one or more periodic resources comprised in said configuration message comprises an identifier in form of a CG configuration ID identifying said particular periodic resource as being a resource for a periodic transmission of the V2X-sidelink communication data for a transmission of a beacon, and wherein the transceiver is configured to recognize, based on the identifier, said particular periodic resource and to use said particular periodic resource for a periodic transmission of the V2X-sidelink communication data.

14. The transceiver of claim 1, wherein the transceiver is configured to periodically sense a predetermined frequency spectrum for the presence of at least one message comprising a data type being related to the V2X-sidelink communication service, and
if the transceiver identifies at least one such message in said predetermined frequency spectrum, the transceiver is configured to transmit the V2X-sidelink communication data.

15. The transceiver of claim 14, wherein the transceiver is configured to periodically sense for the presence of said at least one message being related to the V2X-sidelink communication service inside one selected frequency band of the predetermined frequency spectrum for a predetermined or adjustable sensing duration or sensing interval.

16. The transceiver of claim 15, wherein the transceiver is configured to receive a control message in form of a Radio Resource Control—RRC— message, from a base station, the control message comprising information for the transceiver to adjust at least one of:
a sensing duration,
a sensing interval,
a resource selection duration,
a resource selection interval.

17. A method for operating a transceiver for participating in a V2X-sidelink communication service provided by a wireless communication network, the method comprising:
receiving or transmitting V2X-sidelink communication data via a PC5 interface,
wherein transmitting or receiving said V2X-sidelink communication data is only conditionally available if the following predetermined condition is met:
an intimation signal from another transceiver using a second service being different to the V2X-sidelink communication service is received,
wherein the intimation signal from the second service is at least one of
an explicit signal in form of an explicit trigger or a broadcast signal via MIB/SIB or a groupcast signal, received by the transceiver, or
a resource allocation information within configured resources received by the transceiver,
wherein the intimation signal is received while both transceivers are out-of-coverage of the wireless communication network and operate in NR-Mode 2 in which the two transceivers are directly communicating with each other without assistance from the base station or the wireless communication network.

18. A non-transitory digital storage medium having stored thereon a computer program for performing a method for operating a transceiver for participating in a V2X-sidelink communication service provided by a wireless communication network, the method comprising:
receiving or transmitting V2X-sidelink communication data,
wherein transmitting or receiving said V2X-sidelink communication data is enabled only conditionally if
an intimation signal from a second service being different to the at least one V2X-communication service is received,
wherein the intimation signal from the second service is at least one of
an explicit signal in form of an explicit trigger or a broadcast signal via MIB/SIB or a groupcast signal, received by the transceiver, or
a resource allocation information within configured resources received by the transceiver,
when said computer program is run by a computer,
wherein the intimation signal is received while both transceivers are out-of-coverage of the wireless communication network and operate in NR-Mode 2 in which the two transceivers are directly communicating with each other without assistance from the base station or the wireless communication network.

* * * * *